(12) United States Patent
King et al.

(10) Patent No.: US 12,252,059 B2
(45) Date of Patent: Mar. 18, 2025

(54) COLLAPSIBLE CAMPERS, AND ADJUSTABLE COMPONENTS AND ACCESSORIES FOR CAMPERS AND OTHER DWELLINGS

(71) Applicant: STREAM IT, INC., Austin, TX (US)

(72) Inventors: Lance M. King, Austin, TX (US); Zach Radkey-Pechacek, Austin, TX (US); Nathan Swanson, Austin, TX (US); Timothy Wulff, Austin, TX (US); William A. French, Austin, TX (US); Stanford Dean Richins, Austin, TX (US)

(73) Assignee: STREAM IT, INC., Austin, TX (US)

( * ) Notice: Subject to any disclaimer, the term of this patent is extended or adjusted under 35 U.S.C. 154(b) by 46 days.

(21) Appl. No.: 17/714,948

(22) Filed: Apr. 6, 2022

(65) Prior Publication Data

US 2022/0324370 A1   Oct. 13, 2022

Related U.S. Application Data

(60) Provisional application No. 63/172,033, filed on Apr. 7, 2021, provisional application No. 63/172,034, filed on Apr. 7, 2021.

(51) Int. Cl.
*B60P 3/34*   (2006.01)

(52) U.S. Cl.
CPC ..................... *B60P 3/34* (2013.01)

(58) Field of Classification Search
CPC .... B60P 3/34; B60P 3/341; B60P 3/43; B60P 3/343

(Continued)

(56) References Cited

U.S. PATENT DOCUMENTS

| | | | | |
|---|---|---|---|---|
| 3,190,689 A | * | 6/1965 | Calthorpe | B60P 3/36 52/72 |
| 3,198,571 A | * | 8/1965 | Majeski | B60P 3/423 296/99.1 |

(Continued)

FOREIGN PATENT DOCUMENTS

| | | |
|---|---|---|
| CN | 204222610 U | 3/2015 |
| CN | 206025775 U | 3/2017 |

(Continued)

OTHER PUBLICATIONS

Alaskan Camper LLC, 6.5' Alaskan Truck Camper—Cabover, [online] URL: <http://alaskancampers.com/6-5-cabover/>, 2 pgs., Mar. 11, 2017, retrieved from the internet archive Wayback Machine URL: <https://web.archive.org/web/20170311050558/alaskancampers.com/6-5-cabover/>, retrieved Sep. 19, 2023.

(Continued)

*Primary Examiner* — Gregory A Blankenship
(74) *Attorney, Agent, or Firm* — Procopio, Cory, Hargreaves & Savitch LLP

(57) ABSTRACT

Collapsible campers and shells, and adjustable components and accessories for campers and other dwellings are provided herein. A collapsible dwelling can comprise a collapsible shell comprising an inner shell portion, optionally one or more mid-shell portions, and an outer shell portion, wherein the inner shell portion, the one or more mid-shell portion, and the outer shell portion are adjustably coupled to one another such that the collapsible shell is adjustable from a collapsed configuration to an extended configuration. The collapsible dwelling can comprise a lift system coupled to the collapsible shell and configured to adjust the collapsible shell from the collapsed configuration to the extended configuration.

14 Claims, 21 Drawing Sheets

(58) Field of Classification Search
USPC .............................................. 296/165, 26.05
See application file for complete search history.

(56) References Cited

U.S. PATENT DOCUMENTS

| | | | | |
|---|---|---|---|---|
| 3,321,876 | A * | 5/1967 | Birkenheuer | B60P 3/38 |
| | | | | 296/165 |
| 3,447,831 | A | 6/1969 | Wagner | |
| 4,784,429 | A * | 11/1988 | Hodges | B60J 7/041 |
| | | | | 296/26.05 |
| 5,335,960 | A * | 8/1994 | Benignu, Jr. | B60P 3/341 |
| | | | | 296/100.18 |
| 5,769,485 | A * | 6/1998 | Bontrager | B60P 3/34 |
| | | | | 296/26.05 |
| 6,325,447 | B1 | 12/2001 | Kuo | |
| 6,981,729 | B2 * | 1/2006 | Steury | B60P 3/34 |
| | | | | 296/173 |
| 8,182,020 | B2 * | 5/2012 | Herndon | B62D 35/007 |
| | | | | 296/100.06 |
| 9,302,605 | B1 | 4/2016 | Van Pelt | B60P 3/34 |
| 10,086,684 | B1 * | 10/2018 | Stamm, Jr. | B60J 7/1621 |
| 11,130,437 | B1 * | 9/2021 | Tatro | B60P 3/39 |
| 2001/0030446 | A1 * | 10/2001 | Lambright | B60P 3/34 |
| | | | | 296/156 |
| 2008/0084089 | A1 * | 4/2008 | Hanson | B66C 7/14 |
| | | | | 254/45 |
| 2008/0265618 | A1 * | 10/2008 | Cadena | B60P 3/34 |
| | | | | 296/175 |
| 2016/0347230 | A1 * | 12/2016 | Pellicer | B62D 33/08 |
| 2018/0370414 | A1 * | 12/2018 | Wieth | B60P 3/34 |
| 2019/0154121 | A1 * | 5/2019 | Howie | F16H 19/0645 |
| 2019/0344700 | A1 * | 11/2019 | Steury | B60P 3/341 |
| 2020/0093669 | A1 | 3/2020 | Jepsen et al. | |
| 2020/0131796 | A1 * | 4/2020 | Currid | B60P 3/38 |
| 2021/0323465 | A1 * | 10/2021 | König | B60P 3/34 |
| 2022/0185168 | A1 * | 6/2022 | Niemela | A47C 17/48 |
| 2022/0289097 | A1 * | 9/2022 | Badman | B60P 3/341 |
| 2022/0324370 | A1 * | 10/2022 | King | B60P 3/34 |
| 2023/0103642 | A1 * | 4/2023 | Freshour | B60P 3/34 |
| | | | | 296/173 |
| 2023/0322148 | A1 * | 10/2023 | Wilkerson | E04H 15/06 |
| | | | | 296/173 |
| 2023/0391246 | A1 * | 12/2023 | Gohar | B60N 3/10 |

FOREIGN PATENT DOCUMENTS

| | | | | |
|---|---|---|---|---|
| JP | 2015081459 | A | 4/2015 | |
| WO | 2019233573 | A1 | 12/2019 | |
| WO | WO-2021035287 | A1 * | 3/2021 | ............. B60P 3/341 |

OTHER PUBLICATIONS

Stream It, Inc., Cyberlandr Deploy Silent, Apr. 6, 2021, 2 pgs., [online] URL: <https://www.youtube.com/watch?v=a_2NnFRMLpE>.
Stream It, Inc., Video Cyberlandr Bed Transformation, Apr. 6, 2021, 2 pgs., [online] URL: <https://www.youtube.com/watch?v=bcgoVTKvwNg>.
Alaskan Camper LLC; 6.5' Alaskan Truck Camper—Cabover; 2021; http://alaskancampers.com/6-5-cabover/.
Autoevolution; Boxy, Compact FlexCamp Camper Slides Up and Out Into a 4-Person Micro-Cabin; <https://www.autoevolution.com/news/boxy-compact-flexcamp-camper-slides-up-and-out-into-a-4-person-micro-cabin-177211.html>; published on Dec. 25, 2021.
Stream It, Inc; Cyberlandr; https://www.youtube.com/channel/UC_58ABvBu-fwCloBeln1f2g/videos.
International Search Report and Written Opinion for PCT/US22/23734 dated Aug. 15, 2022, 14 pages.
International Preliminary Report on Patentability for PCT App No. PCT/US2022/023734 dated Oct. 19, 2023, 11 pgs.

* cited by examiner

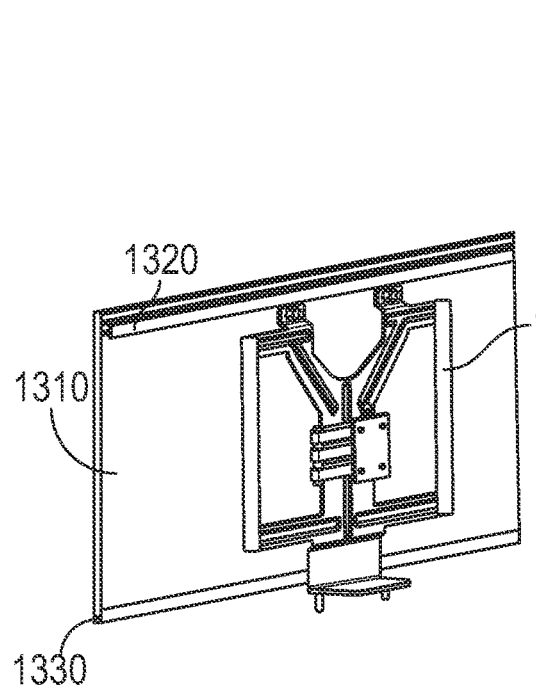
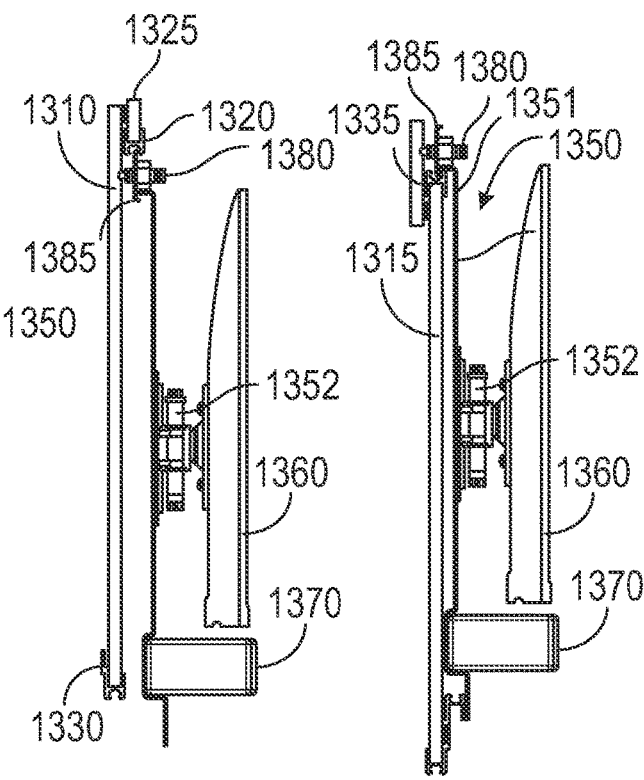
FIG. 13A  FIG. 13B  FIG. 13C
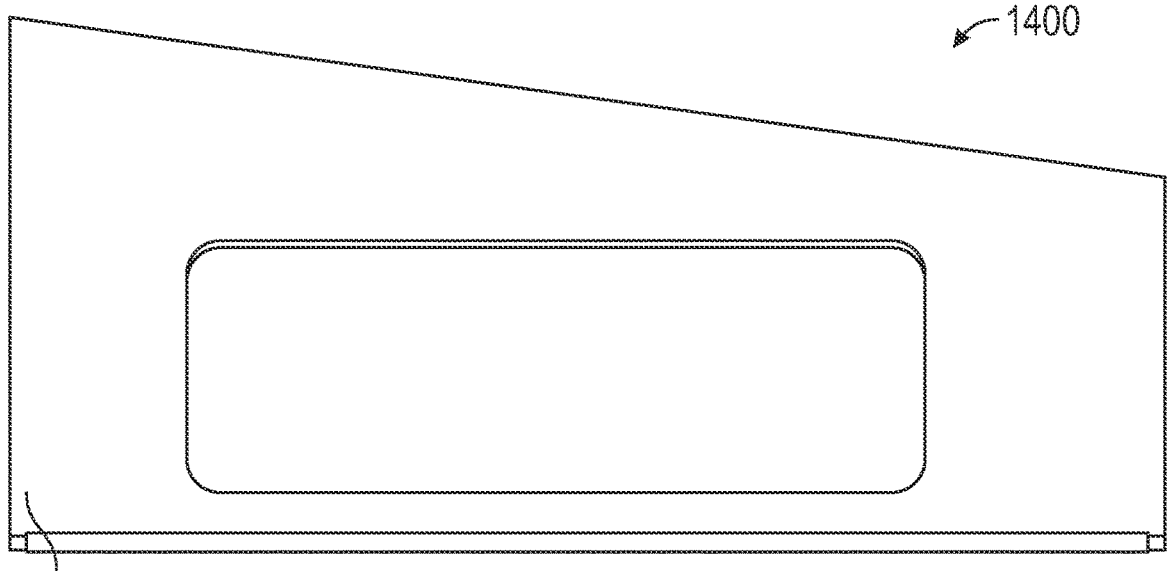
FIG. 14A

COLLAPSIBLE CAMPERS, AND ADJUSTABLE COMPONENTS AND ACCESSORIES FOR CAMPERS AND OTHER DWELLINGS

CROSS-REFERENCE TO RELATED APPLICATIONS

This application claims priority to U.S. Provisional Patent App. No. 63/172,033, filed on Apr. 7, 2021, and U.S. Provisional Patent App. No. 63/172,034, filed on Apr. 7, 2021. These and all other extrinsic materials discussed herein, including publications, patent applications, and patents, are incorporated by reference in their entirety. Where a definition or use of a term in an incorporated reference is inconsistent or contrary to the definition of that term provided herein, the definition of that term provided herein applies and the definition of the term in the reference does not apply.

BACKGROUND

1. Field of the Invention

The description herein is generally directed to collapsible campers, collapsible camper shells, and adjustable components and accessories for campers and other dwellings, including trailers (e.g., those coupled to and towed by a vehicle) recreational vehicles ("RV"s).

2. Description of the Related Art

Conventional trailers are typically towed behind a vehicle and are not collapsible. Such trailers can make parking more difficult (or even impossible in certain spaces), and generally require a reduced driving speed for the vehicle towing the trailer. Conventional campers and camper shells typically fit partially in or on the bed of a pickup truck, and are typically large, non-adjustable structures that are configured to be clamped on above a truck bed. However, such campers and camper shells are difficult to install and remove (often requiring 4 or more people), and generally raise the profile of the vehicle, which can reduce gas mileage/range, prevent parking in a garage or other parking space with a lower ceiling.

SUMMARY

Accordingly, collapsible campers and adjustable components and accessories for campers and other dwellings are provided herein. As used herein, the term "dwellings" should be interpreted broadly to include trailers, RVs, and mobile businesses, homes (temporary or permanent) and offices.

In some aspects, a collapsible camper shell is provided, comprising an inner shell portion and an outer shell portion, wherein the inner shell portion and the outer shell portion are adjustably coupled to one another such that the camper shell is adjustable from a collapsed configuration to an extended configuration. In some aspects, the collapsible camper shell further comprises a mid-shell portion adjustable coupled to the inner shell portion and the outer shell portion, and the camper shell is adjustable from a collapsed configuration to an extended configuration. A lift system, for example, any of the lift systems described herein, can be coupled to the camper shell and configured to cause the camper shell to adjust from the collapsed configuration to the extended configuration (and from the extended configuration to the collapsed configuration).

In some aspects, collapsible campers and other dwellings (e.g., trailers) are provided herein, comprising a multi-panel shell. The campers and camper shells described herein can be provided, for example, on a Cybertruck™. The Cybertruck concept introduced by Tesla is noticeably aerodynamic and a conventional camper shell will not only not fit in the bed of the Cybertruck, such a conventional camper shell design simply does not go with the shape, form, and overall look and feel of the Cybertruck. Contemplated campers and camper shells can be configured to be aerodynamic and completely stowed within the bed of a vehicle (e.g., Cybertruck) when the vehicle is moving or access to the camper or camper shell is not needed.

It should be appreciated that other dwellings (e.g., trailers) can be collapsible as include some or all of the components and features described in connection with campers and camper shells herein (e.g., one or more of the adjustable shells, lift systems, edge trims, power windows, adjustable beds and chairs). Rather than fitting in the bed of the Cybertruck, collapsible trailers of the disclosure can be configured to be coupled to and towed by a vehicle, The trailer can be in a collapsed configuration, for example, when being towed by a moving vehicle, and be expanded (at least one of vertically and horizontally), for example, when parked.

In some aspects, a collapsible camper or other dwelling is provided, comprising (a) a camper shell (or trailer or other shell) comprising an inner shell portion, a mid-shell portion, and an outer shell portion, wherein the inner shell portion, the mid-shell portion, and the outer shell portion are adjustably coupled to one another such that the camper shell (or trailer or other shell) is adjustable from a collapsed configuration to an extended configuration, and (b) a lift system coupled to the camper shell (or trailer or other shell) and configured to adjust the camper shell (or trailer or other shell) from the collapsed configuration to the extended configuration.

Contemplated camper shells (or trailer or other shells) can comprise any suitable number of shell portions, for example, 2, 3, 4, 5, 6, 7, 8, or even more shell portions. In some embodiments, a mid-shell portion (where included) can be directly coupled to the inner shell portion and the outer shell portion. In some embodiments, the mid-shell portion can be indirectly coupled to the inner shell portion and the outer shell portion. In some embodiments, the mid-shell portion can be directly coupled to the inner shell portion and indirectly coupled to the outer shell portion. In some embodiments, the mid-shell portion can be indirectly coupled to the inner shell portion and directly coupled to the outer shell portion.

Contemplated lift systems can comprise, for example, a first telescoping arm, and a first motor configured to cause the first telescoping arm to extend from a telescoped arm configuration to an extended arm configuration. Additionally, contemplated lift systems can comprise a second telescoping arm, wherein a second motor (or the first motor) is configured to cause the second telescoping arm to extend from a telescoped arm configuration to an extended arm configuration. In some aspects, the lift system can comprise a base, a first bracket, and a second bracket. The first and second telescoping arms can be connected to the first and second brackets. The lift system can comprise a spring, wherein the base further comprises a first elongated housing coupled to the first bracket, and wherein the push spring is movably positioned at least partially within the first housing, the first bracket, and the first telescoping arm. A second push spring can be provided, wherein the base further comprises a second elongated housing coupled to the second bracket, and wherein the second push spring is movably positioned at least partially within the second housing, the second bracket, and the second telescoping arm. The lift system can further comprise one or more translation elements, each of which can be coupled to a motor and a carriage. Each carriage can be coupled to a spring, wherein the motor is configured to cause the carriage to move in a first direction along an elongated housing, which moves the spring in the first direction and causes a telescoping arm to extend from a telescoped arm configuration to an extended arm configuration.

In some aspects, the outer shell portion of a camper or other shell can comprise or be coupled to a roof portion (e.g., an angled roof to match the angled top of a Cybertruck). The base of the lift system can be positioned on a floor of the camper or other dwelling, and an end of the first telescoping arm opposite the end coupled to the first bracket can be coupled to a bottom side (inner side) of the roof portion. An end of the second telescoping arm opposite the end coupled to the second bracket can also be coupled to a bottom side (inner side) of the roof portion. Additionally or alternatively, the base of the lift system can be positioned on a roof of the camper or other shell, and an end of the first telescoping arm opposite the end coupled to the first bracket can be coupled to a floor of the camper or other dwelling. An end of the second telescoping arm opposite the end coupled to the second bracket can also be coupled to the floor of the camper or other dwelling. Additionally or alternatively, the base of the lift system can be positioned on an interior side portion of the camper or other dwelling, and an end of the first telescoping arm opposite the end coupled to the first bracket can be coupled to an interior surface of a second (e.g., opposite) side of the camper or other dwelling (which can comprise, for example a shell portion or an expanding portion). An end of the second telescoping arm opposite the end coupled to the second bracket can also be coupled to an interior surface of the second (e.g., opposite) or a third side of the camper or other dwelling.

In some aspects, the base of the lift system can be expandable. In some aspects, the elongated housing(s) of the lift system can be expandable. For example, it is contemplated that a length between the first bracket and the second bracket can be adjustable. In some embodiments, for example, where the lift system is used to adjust large campers or camper shells, the lift system can comprise additional telescoping arms, motors, brackets, springs, translation elements, and carriages (e.g., up to 3 arms, up to 4 arms, up to 5 arms, up to 10 arms, up to 3 motors, up to 4 motors, up to 5 motors, up to 10 motors, up to 3 brackets, up to 4 brackets, up to 5 brackets, up to 10 brackets, up to 3 springs, up to 4 springs, up to 5 springs, to 10 springs, up to 3 translation elements, up to 4 translation elements, up to 5 translation elements, up to 10 translation elements, up to 3 carriages, up to 4 carriages, up to 5 carriages, up to 10 carriages).

In some aspects, one or more camper shell portions of a camper shell (or other shell portions of another shell, e.g., a trailer shell) can comprise one or more of a lower edge trim and an upper edge trim. An upper edge trim coupled to an upper edge of a shell portion can comprise a lower leg. The lower leg can be spaced apart from at least one of another portion of the edge trim and the shell portion when the upper edge trim is coupled to the shell portion, leaving a small gap. A lower edge trim coupled to a bottom edge of a shell portion can comprise an upper leg. The upper leg can be spaced apart from at least one of another portion of the edge trim and the shell portion when the lower edge trim is coupled to the shell portion. In some aspects, when a camper shell is being expanded (from a collapsed configuration), the upper leg of a lower edge trim of a first shell portion can engage or be engaged a lower leg of an upper edge trim of a second shell portion (e.g., a shell portion behind or in front of the first shell portion) and pull up (or assist in pulling up) the second shell portion when the camper shell is adjusted from the collapsed configuration to the extended configuration. The upper leg of a lower edge trim can engage or be engaged by a lower leg of an upper edge trim, for example, by moving into a position between the lower leg and the second shell portion. In some aspects, contemplated edge trims can comprise one or more slots, for example, a T-slot configured to receive a portion of an accessory mount.

In some aspects, contemplated camper or other shells can comprise expanding portions that are configured to expand horizontally from one or more of the camper or other shell portions. For example, a first expanding portion coupled to at least one of an inner shell portion, one or more mid-shell portions (where included), and the outer shell portion, wherein an inner surface of the at least one of the inner shell portion, the mid-shell portion, and the outer shell portion comprises a first adjustment component (e.g., a slider), wherein an outer surface of the first expanding portion comprises a second adjustment component (e.g., a complementary slider), and wherein the first adjustment component and the second adjustment component are slidably coupled to one another such that the first expanding portion is adjustable horizontally relative to the at least one of the inner shell portion, the mid-shell portion, and the outer shell portion. Contemplated camper shells can have no expanding portions or any suitable number of expanding portions (e.g., 2-5, 2-10). In some aspects, the number of expanding portions can match the number of shell portions. In some aspects, the number of expanding portions can be 1 less than the number of shell portions. In some aspects, the number of expanding portions can be 1 greater than the number of shell portions. In some aspects, the number of expanding portions can be up to 2 less than the number of shell portions. In some aspects, the number of expanding portions can be up to 2 greater than the number of shell portions. In some aspects, the number of expanding portions can be up to 3 less than the number of shell portions. In some aspects, the number of expanding portions can be up to 3 greater than the number of shell portions.

In some aspects, a lift system is provided, which can be used to lift or expand various objects (e.g., a collapsible camper shell, collapsible trailer shell as described herein). A lift system can comprise a base extending between a first bracket and a second bracket, the base comprising a first elongated housing coupled to a first bracket, a second elongated housing coupled to a second bracket, a carriage positioned in the first elongated housing, the carriage coupled to a spring, and a motor coupled to the carriage. The lift system can further comprise a first telescoping arm coupled to the first bracket, a second telescoping arm coupled to the second bracket, wherein the spring is positioned at least partially in each of the first elongated housing, the first bracket, and the first telescoping arm, and wherein the motor is configured to cause the carriage to move in a first direction through the first elongated housing, which moves the spring in the first direction and causes the first telescoping arm to extend from a telescoped arm configuration to an extended arm configuration. It should be appreciated that some contemplated lift systems comprise springs that curve on two or more planes (rather than just one, for example a spring may curve horizontally before curving vertically or may curve horizontally and vertically simultaneously), which can advantageously provide a lift system with springs that get as close to the corners as possible.

The lift systems described herein can comprise a translation element (e.g., translation element, ball screw, or other element that functions to translate rotational motion into linear) coupled to a motor, and the carriage can comprise a threaded opening comprising threads complementary to threads of the translation element. The motor can be configured to drive the translation element to cause the carriage to move in the first direction. In some aspects, a second elongated housing coupled to a second bracket is provided. A second carriage can be positioned in the second elongated housing, the second carriage coupled to a second spring, and a second motor coupled to the second carriage, wherein the second spring is positioned at least partially in each of the second elongated housing, the second bracket, and the second telescoping arm, and wherein the second motor is configured to cause the second carriage to move in a second direction through the second elongated housing (e.g., via a translation element), which moves the second spring in the second direction and causes the second telescoping arm to extend from a telescoped arm configuration to an extended arm configuration. In some aspects, the telescoping arms can have the same or different maximum lengths. For example, the second telescoping arm can be shorter, the same length as, or longer than the first telescoping arm when the first and second telescoping arms are in fully extended arm configurations.

While lift systems are generally described as having two sets of components (e.g., arms, elongated housings, carriages, springs, motors, translation elements), it should be appreciated that contemplated lift systems can comprise any suitable number of any components (e.g., up to 3 arms, up to 4 arms, up to 5 arms, up to 10 arms, up to 3 motors, up to 4 motors, up to 5 motors, up to 10 motors, up to 3 brackets, up to 4 brackets, up to 5 brackets, up to 10 brackets, up to 3 springs, up to 4 springs, up to 5 springs, to 10 springs, up to 3 translation elements, up to 4 translation elements, up to 5 translation elements, up to 10 translation elements, up to 3 carriages, up to 4 carriages, up to 5 carriages, up to 10 carriages).

In some aspects, a power window system is provided, comprising a tiltable or otherwise adjustable window and an adjustment mechanism coupled to the window via a first attachment affixed to the window. The window adjustment mechanism can comprise a motor, a translation element coupled to the motor, a link, and a translation element nut, wherein a first end of the link is pivotably coupled to the first attachment and a second end of the link is coupled to translation element nut, and wherein when the translation element nut moves in an upward direction, the link applies a force to the pivot component and causes the window to rotate about a top axis. In some embodiments, the link can comprise a variable length link (e.g., a telescoping link) that has a compression length and a tension length different from the compression length. The window can comprise a multi-layer window stack comprising, among other things, an air gap and one or more sheets of Willow® glass by Corning Incorporated, or other protective layer. An insect screen can be provided and configured to removably couple to a window frame via a set of magnets or other attachment mechanism. In some aspects, an electronic control unit (or "sensor module") can be provided for each window, which can be configured to control the opening and closing, tilting or the window, and can optionally incorporate a camera (e.g., for surveillance), and provide a USB port to power/charge devices.

In some aspects, an adjustable bed (also referred to herein as "adjustable chair") is provided, comprising a frame having a first portion, a second portion, and a third portion, wherein the first portion is coupled to the second portion via a rotatable member, and the second portion is coupled to the third portion via a rotatable member. In some embodiments, the first portion can be configured to couple to a vertically slidable component of a camper or trailer wall, or to an edge trim or other component of a shell component. In some aspects, the adjustable bed can comprise a set of telescoping legs coupled to the frame.

In some aspects, an adjustable bed (also referred to herein as "adjustable chair") is provided, comprising a frame having a first portion, a second portion, and a third portion, wherein the first portion is coupled to the second portion via a rotatable member, and the second portion is coupled to the third portion via a rotatable member, and a first set of legs rotatably coupled to the first portion and configured to adjust from a stow configuration to a use configuration. In some aspects, at least one of the first, second and third portions can be adjustable in length. In some aspects, each of the first, second and third portions can be adjustable in length. Such adjustable portion(s) can advantageously allow the seat, back height, seat depth, and seat height to each be adjusted (when used as a chair or recliner), and the length of the bed or portion thereof (e.g., back rest height) to be adjusted (when used as a bed).

In some aspects, an adjustable bed (also referred to herein as "adjustable chair") is provided, comprising a frame having a first portion, a second portion, and a third portion, wherein the first portion is coupled to the second portion via a rotatable member, and the second portion is coupled to the third portion via a rotatable member, and wherein the first portion is configured to couple to a slot of an edge trim of a shell portion of a camper.

Other advantages and benefits of the disclosed compositions and methods will be apparent to one of ordinary skill with a review of the following drawings and detailed description.

BRIEF DESCRIPTION OF THE DRAWINGS

The details of the present invention, both as to its structure and operation, may be gleaned in part by study of the accompanying drawings, in which like reference numerals refer to like parts, and in which:

FIGS. 13A-13C illustrate an accessory mounting device, according to an embodiment;

FIGS. 14A-14C illustrate a camper shell expanding vertically and horizontally, according to an embodiment;

DETAILED DESCRIPTION

Figure 1:
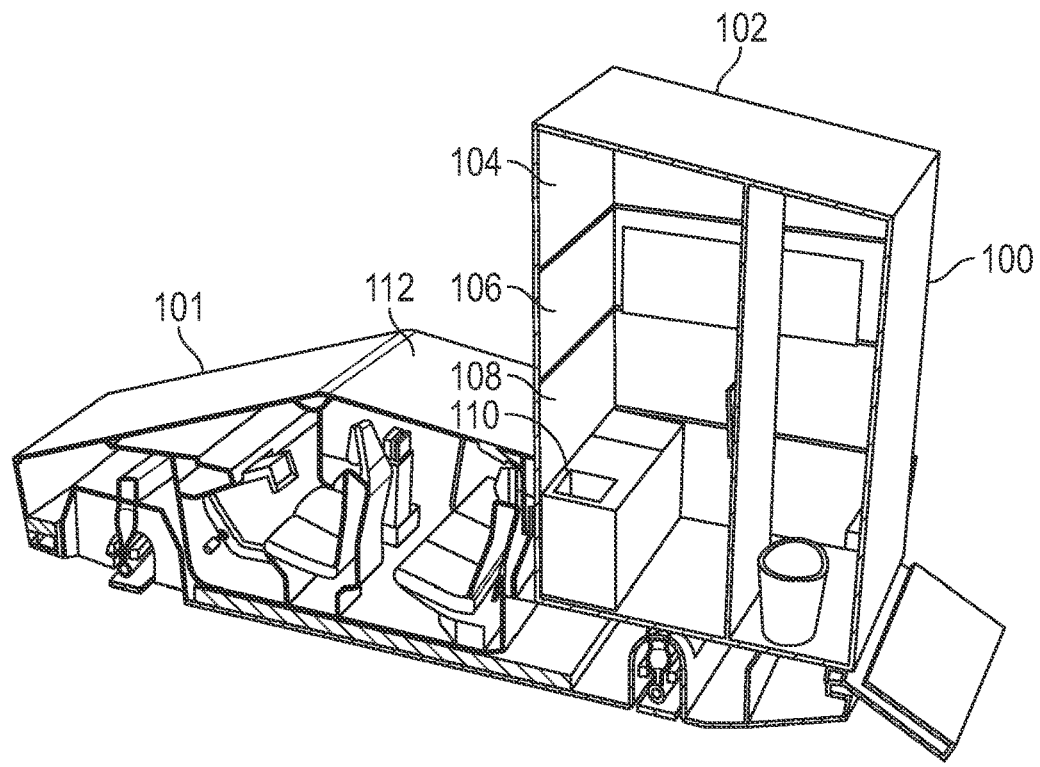
FIG. 1 illustrates an example collapsible camper, according to an embodiment.

After reading this description, it will become apparent to one skilled in the art how to implement the inventive subject matter in various alternative embodiments and alternative applications. However, although various embodiments of the present disclosure will be described herein, it is understood that these embodiments are presented by way of example and illustration only, and not limitation. As such, this detailed description of various embodiments should not be construed to limit the scope or breadth of the present disclosure as set forth in the appended claims.

Collapsible Camper Shell; Collapsible Camper

In some aspects, a collapsible camper shell (or collapsible trailer or other dwelling shell) is provided, comprising an inner shell portion, an optional mid-shell portion, and an outer shell portion, wherein the inner shell portion, the mid-shell portion (where included), and the outer shell portion are adjustably coupled to one another such that the camper shell is adjustable from a collapsed configuration to an extended configuration. A lift system can be coupled to the collapsible shell and configured to cause the collapsible shell to adjust from the collapsed configuration to the extended configuration (and from the extended configuration to the collapsed configuration).

In some aspects, a collapsible camper or other dwelling (e.g., trailer) is provided, comprising (a) a collapsible shell comprising an inner shell portion, one or more optional mid-shell portions, and an outer shell portion, wherein the inner shell portion, the mid-shell portion(s) (where provided), and the outer shell portion are adjustably coupled to one another such that the collapsible shell is adjustable from a collapsed configuration to an extended configuration, and (b) a lift system coupled to the collapsible shell and configured to adjust the collapsible shell from the collapsed configuration to the extended configuration.

Contemplated camper and other shells (standalone shell or a shell of a camper or other dwelling) can comprise any suitable number of shell portions, for example, 2, 3, 4, 5, 6, 7, 8, at least 2, at least 3, at least 4, at least 5, at least 6, at least 7, at least 8, at least 9, at least 10, between 1-50, between 2-25, between 3-25, between 3-10, or any other number of shell portions. In some embodiments, the mid-shell portion (where included) can be directly coupled to the inner shell portion and the outer shell portion. In some embodiments, the mid-shell portion can be indirectly coupled to the inner shell portion and the outer shell portion. In some embodiments, the mid-shell portion can be directly coupled to the inner shell portion and indirectly coupled to the outer shell portion. In some embodiments, the mid-shell portion can be indirectly coupled to the inner shell portion and directly coupled to the outer shell portion. Contemplated shell portions can be of any suitable size and shape, and may vary depending on the type of dwelling. Contemplated campers and other dwellings can be configured to have any suitable size in a collapsed configuration and any suitable size in an extended configuration. For example, in some aspects, it is contemplated that a collapsed camper or other dwelling can be about 30-100 inches×40-150 inches×10-60 inches, or about 40-90 inches×50-90 inches×20-50 inches, or about 50-80 inches×55-90 inches×20-50 inches, or about 66 inches×about 72 inches×about 36 inches, or any other suitable dimensions. In some aspects, it is contemplated that the camper or other dwelling can be at least 10% taller, at least 20% taller, at least 30% taller, at least 40% taller, at least 50% taller, at least 60% taller, at least 70% taller, at least 80% taller, at least 90% taller, at least 100% taller, at least 125% taller, at least 150% taller, at least 175% taller, at least 200% taller, at least 225% taller, at least 250% taller, at least 275% taller, at least 300% taller, at least 325% taller, at least 350% taller, at least 375% taller, or at least 400% taller in an expanded configuration than in a collapsed configuration. In some aspects, it is contemplated that the camper or other dwelling can be at least 10% longer (horizontally), at least 20% longer, at least 30% longer, at least 40% longer, at least 50% longer, at least 60% longer, at least 70% longer, at least 80% longer, at least 90% longer, at least 100% longer, at least 125% longer, at least 150% longer, at least 175% longer, at least 200% longer, at least 225% longer, at least 250% longer, at least 275% longer, at least 300% longer, at least 325% longer, at least 350% longer, at least 375% longer, or at least 400% longer in an expanded configuration than in a collapsed configuration. In some aspects, it is contemplated that the camper or other dwelling can have a square footage in an expanded configuration that is at least 125%, at least 150%, at least 175%, at least 200%, at least 225%, at least 250%, at least 275%, at least 300%, at least 325%, at least 350%, at least 375%, at least 400%, at least 450%, or even at least 500% of the square footage of the camper or other dwelling in a collapsed configuration.

In some aspects, it is contemplated that each shell portion can be one or more of shorter in height (e.g., by about 0.25-2 inches, by about 0.5 to 1 inch, by about ¾ inch), shorter in length (e.g., by about 0.25-2 inches, by about 0.5 to 1 inch, by about ¾ inch), and thinner (e.g., by about 0.25-2 inches, by about 0.5 to 1 inch, by about ¾ inch, by about 1-25 mm, about 1-15 mm, by about 5-35 mm) than the one above it (extended) and outset (collapsed) of it.

Contemplated lift systems can comprise, for example, a first telescoping arm, and a first motor configured to cause the first telescoping arm to extend from a telescoped arm configuration to an extended arm configuration. Additionally, contemplated lift systems can comprise a second telescoping arm, wherein a second motor (or the first motor) is configured to cause the second telescoping arm to extend from a telescoped arm configuration to an extended arm configuration. In some aspects, the lift system can comprise a base, a first bracket, and a second bracket. The first and second telescoping arms can be connected to the first and second brackets. The lift system can comprise a spring, wherein the base further comprises a first elongated housing coupled to the first bracket, and wherein the push spring is movably positioned at least partially within the first housing, the first bracket, and the first telescoping arm. A second push spring can be provided, wherein the base further comprises a second elongated housing coupled to the second bracket, and wherein the second push spring is movably positioned at least partially within the second housing, the second bracket, and the second telescoping arm. The lift system can further comprise one or more translation elements, each of which can be coupled to a motor and a carriage. Each carriage can be coupled to a spring, wherein the motor is configured to cause the carriage to move in a first direction along an elongated housing, which moves the spring in the first direction and causes a telescoping arm to extend from a telescoped arm configuration to an extended arm configuration. Other contemplated lift systems can include, among others, multi-segment scissor lift systems, or actuators (e.g., pneumatics or hydraulics, in addition to or alternatively to translation elements) to directly lift the camper segments. However, such pneumatics or hydraulics can sometimes increase maintenance requirements and potential leaks and other issues.

In some aspects, the outer shell portion of a camper or other shell (e.g., a standalone camper or trailer shell or a collapsible shell of a camper or trailer) can comprise a roof portion. In some aspects, the outer shell portion can have four side walls. The roof can extend across and cover an opening formed by the walls. In some aspects, at least two of the walls can have different heights from one another, and the roof can be angled relative to horizontal (e.g., a floor, ground or truck bed). For example, the roof can be angled between 5-45, or between 5-30 degrees relative to horizontal, and can match the angled tonneau cover. The base of the lift system can be positioned on a floor of the camper, the ground, or other substantially horizontal surface, and an end of the first telescoping arm opposite the end coupled to the first bracket can be coupled to a bottom side (interior facing side) of the roof portion. An end of the second telescoping arm opposite the end coupled to the second bracket can also be coupled to a bottom side of the roof portion at a location different from the end of the first telescoping arm.

In some aspects, the base of the lift system can be expandable. In some aspects, the elongated housing(s) of the lift system can be expandable. For example, it is contemplated that a length between the first bracket and the second bracket can be adjustable. In some embodiments, for example, where the lift system is used to adjust large campers (or trailers or other dwellings) or camper shells (or trailer shells or other collapsible shells), the lift system can comprise additional telescoping arms, motors, brackets, springs, translation elements, and carriages (e.g., up to 3 arms, up to 4 arms, up to 5 arms, up to 10 arms, up to 3 motors, up to 4 motors, up to 5 motors, up to 10 motors, up to 3 brackets, up to 4 brackets, up to 5 brackets, up to 10 brackets, up to 3 springs, up to 4 springs, up to 5 springs, to 10 springs, up to 3 translation elements, up to 4 translation elements, up to 5 translation elements, up to 10 translation elements, up to 3 carriages, up to 4 carriages, up to 5 carriages, up to 10 carriages).

In some aspects, one or more of the lift systems described herein (e.g., those shown in FIGS. 15A-15D) can be used to expand and collapse any of the collapsible shells and campers or other dwellings described herein.

Now turning to the figures, FIG. 1 is a cross-sectional view of an exemplary collapsible camper expanded from within a bed or trunk portion of a vehicle. While the figures herein are generally directed to campers and camper shells, it should be appreciated that some or all of the components and features described herein can be provided in contemplated trailers, trailer shells, and other collapsible dwellings and shells.

The vehicle 101 comprises a roof portion 112. Camper 100 can be stored in the bed or trunk portion of vehicle 101, for example, under a tonneau cover, retractable cover, or other cover, optionally with camper roof 102 aligning with roof portion 112, when in a collapsed configuration. Camper 100 comprises an inner shell portion 110, a mid-shell portion 108, a second mid-shell portion 106, and an outer shell portion 104. Outer shell 104 comprises or is coupled to a roof portion 102. In some aspects, roof portion 102 can comprise one or more solar panels.

Figure 2A:
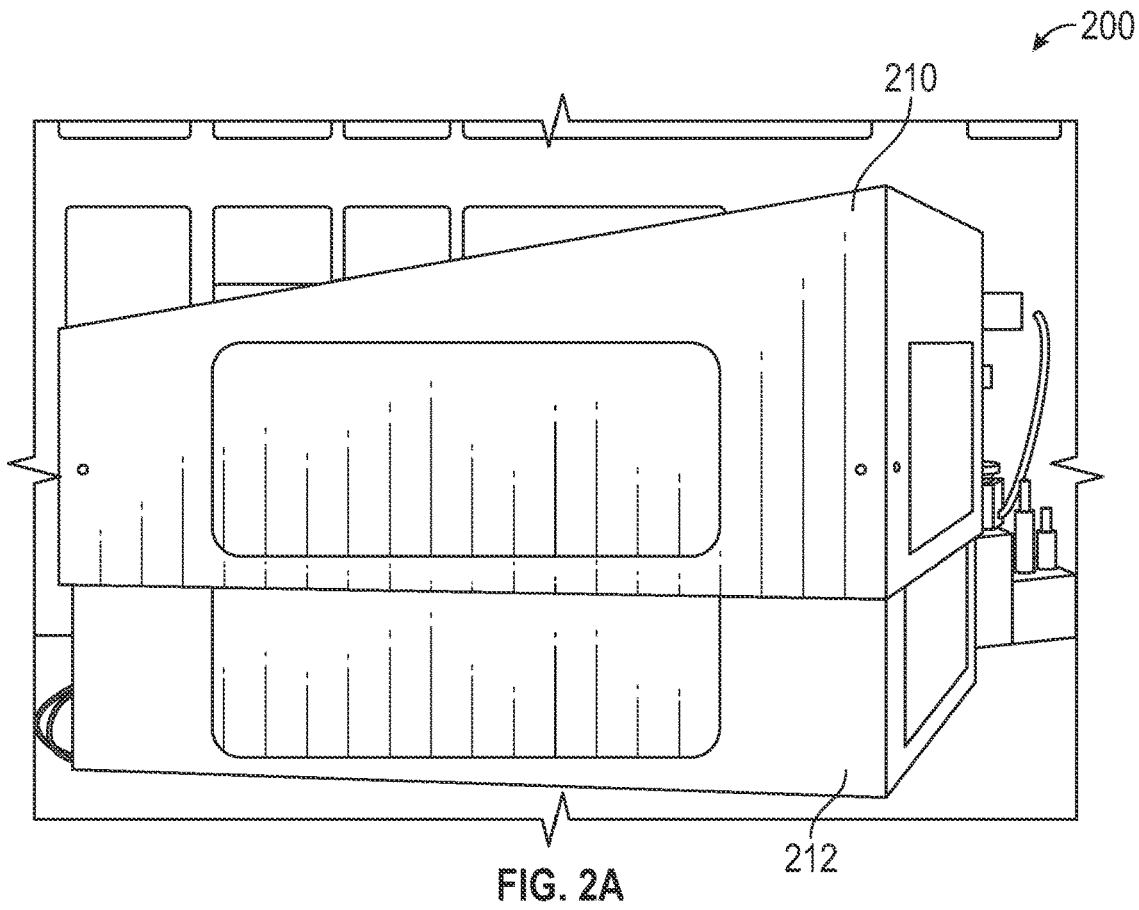
FIGS. 2A-2B illustrate a collapsible camper shell expanding, according to an embodiment.
Figure 2B:
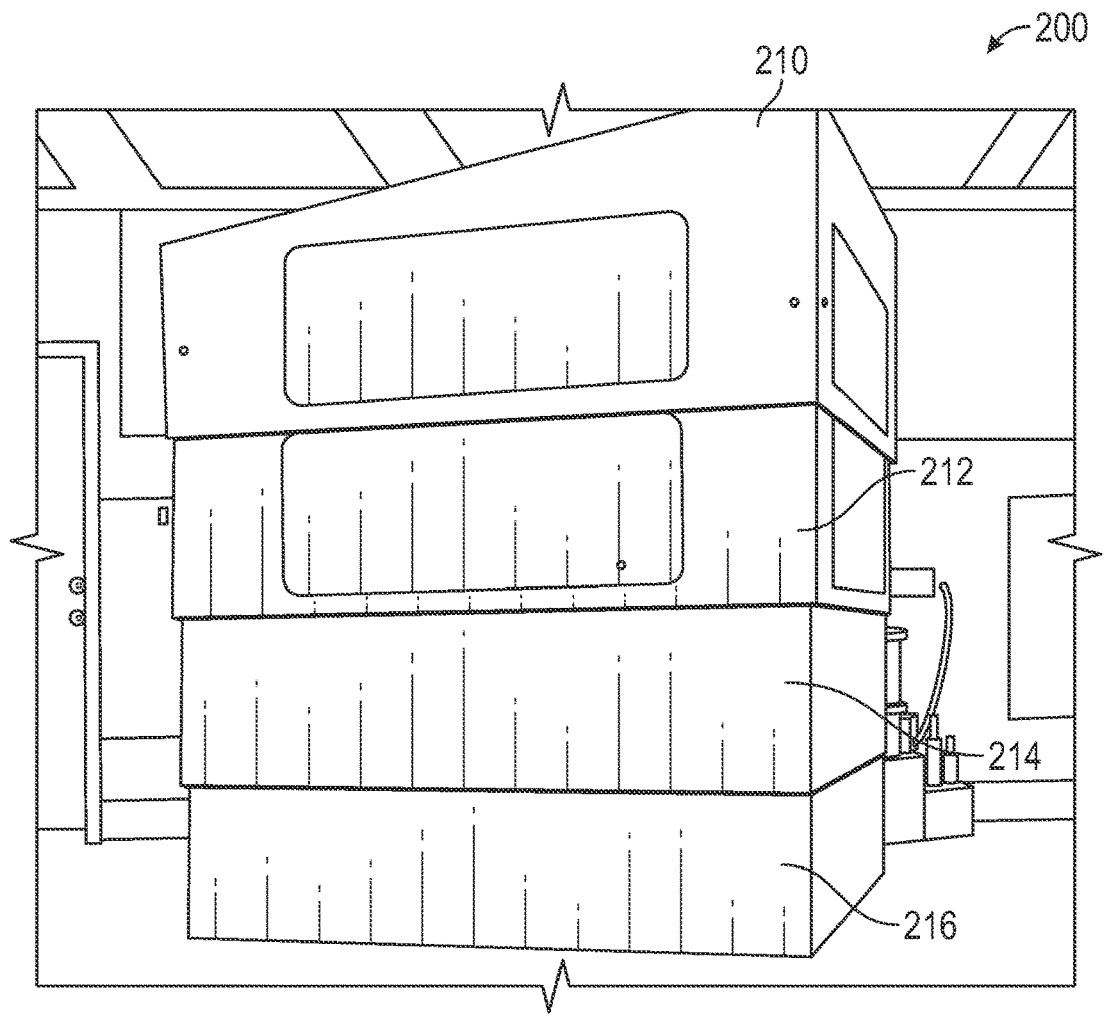

FIGS. 2A-2B illustrate a collapsible camper shell expanding, according to an embodiment. FIG. 2A shows camper 200 partially expanded, with a mid-shell portion 212 extending out from below outer shell portion 210. FIG. 2B shows camper 200 in a fully expanded configuration, with inner shell portion 216 extending out beneath mid-shell portion 214, mid-shell portion 214 extending out beneath mid-shell portion 212, and mid-shell portion 210 extending out beneath outer shell portion 210. It is contemplated that there may be an overlap between a bottom edge of one shell portion and an upper edge of another shell portion when camper shell 200 is in a fully expanded configuration. For example, there may be between a 1-30%, between a 1-20%, between a 1-15%, or between a 1-10% overlap between adjacent shell portions when camper shell 200 is in a fully expanded configuration (e.g., where there is a 5% overlap between shell portion 216 and shell portion 214, about 5% of shell portion 214 is positioned in front of about 5% of shell portion 216). The shell portions may be coupled to one another in any suitable matter, for example, via one or more edge trims described herein and shown in FIGS. 9-11. One or more of the shell portions (e.g., outer shell portion 210, mid-shell portion 212) can comprise any suitable number of windows.

In some aspects, an inner shell portion can have a smaller height than a mid-shell portion, and a mid-shell portion can have a smaller height than the outer shell portion. In some aspects, an inner shell portion can have a smaller height than a first mid-shell portion, the first mid-shell portion can have a smaller height than a second mid-shell portion, and the second mid-shell portion can have a smaller height than the outer shell portion. Viewed from another perspective, the shell portions can have increasing heights from an inner shell portion to an outer shell portion. Additionally or alternatively, the inner shell portion can have a smaller horizontal length than a mid-shell portion, and the mid-shell portion can have a smaller horizontal length than the outer shell portion. In some aspects, an inner shell portion can have a smaller horizontal length than a first mid-shell portion, the first mid-shell portion can have a smaller horizontal length than a second mid-shell portion, and the second mid-shell portion can have a smaller horizontal length than the outer shell portion. Viewed from another perspective, the shell portions can have increasing horizontal lengths from an inner shell portion to an outer shell portion.

Viewed from yet another perspective, in some embodiment, each successive shell portion can be slightly longer and wider than the previous (relatively inner when collapsed, relatively lower when expanded) section so that the top most section 210 fits around all three of the other sections 212, 214, and 216, section 212 fits around sections 214 and 216, and section 214 fits around section 216. Camper shell can have or be coupled to any suitable mechanism (e.g., a crank or a motor that can move the shell portions up or down, or a lift system as described elsewhere herein).

In some embodiments, an inner shell portion can have a greater height than a mid-shell portion, and a mid-shell portion can have a greater height than the outer shell portion. In some aspects, an inner shell portion can have a greater height than a first mid-shell portion, the first mid-shell portion can have a greater height than a second mid-shell portion, and the second mid-shell portion can have a greater height than the outer shell portion. Viewed from another perspective, the shell portions can have decreasing heights from an inner shell portion to an outer shell portion. In some aspects, the inner shell portion can comprise or be coupled to a roof portion.

Additionally or alternatively, the inner shell portion can have a greater horizontal length than a mid-shell portion, and the mid-shell portion can have a greater horizontal length than the outer shell portion. In some aspects, an inner shell portion can have a greater horizontal length than a first mid-shell portion, the first mid-shell portion can have a greater horizontal length than a second mid-shell portion, and the second mid-shell portion can have a greater horizontal length than the outer shell portion. Viewed from another perspective, the shell portions can have decreasing horizontal lengths from an inner shell portion to an outer shell portion.

In some aspects, each shell portion can have four side walls. In some aspects, one or more shell portions can have a top to bottom height of between 1-8 feet, 1-5 feet, between 1-4 feet, between 1-3 feet, or any other suitable height. In some aspects, one or more shell portions can have a front to back length of between 2-20 feet, 2-15 feet, 2-8 feet, between 2-7 feet, between 2-6 feet, between 2-5 feet, or any other suitable length. In some aspects, one or more shell portions (for example a shell portion of a collapsible shell having an angled roof portion, or a shell portion of a collapsible shell configured to be coupled to an angled roof portion, or a shell portion of a camper that is configured to be stored in a space having an angled top portion or cover) can comprises a rear wall that is rectangular and has a shorter height than a rectangular front wall, and two side walls having a shorter side and a longer side with an angled top edge. The shorter sides can align with the rear wall, and the longer sides can align with the front wall. In some aspects, one or more shell portions (for example a shell portion of a camper shell having an angled roof portion, or a shell portion of a camper shell configured to be coupled to an angled roof portion, or a shell portion of a camper that is configured to be stored in a space having an angled top portion or cover) can comprises a front wall that is rectangular and has a shorter height than a rectangular rear wall, and two side walls having a shorter side and a longer side with an angled top edge. The shorter sides can align with the front wall, and the longer sides can align with the rear wall.

It should be appreciated that camper 200 can comprise any suitable interior accessory or component (e.g., adjustable bed, console, vanity, sink, stovetop) described herein. It should also be appreciated that camper 200 can comprise any suitable mechanism for expanding and collapsing camper 200 (e.g., lift system 1500 and other mechanisms described herein).

Figure 3A:
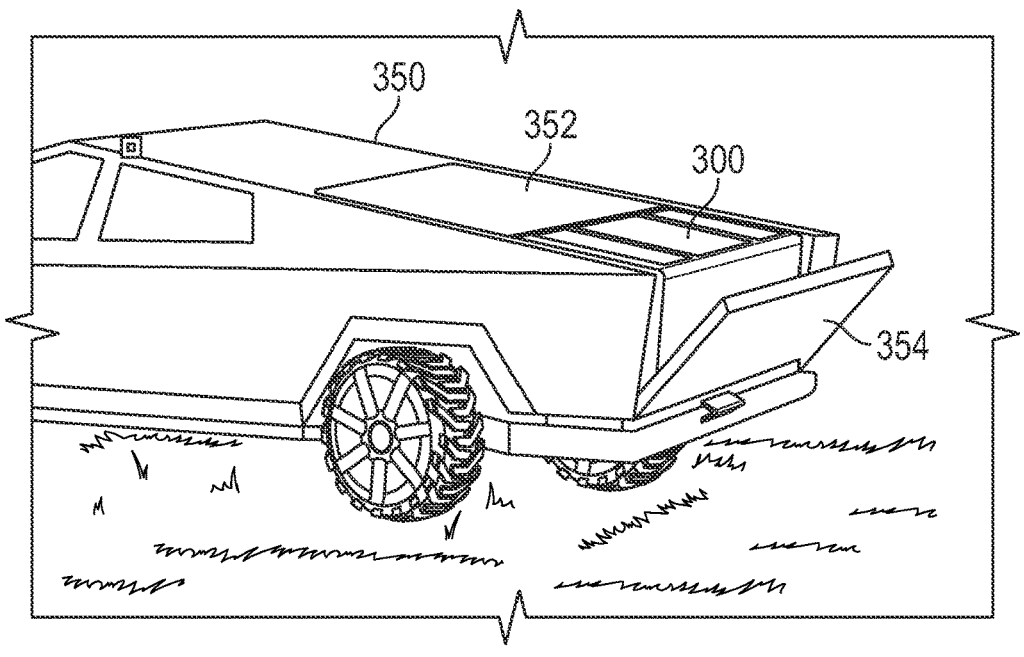
FIGS. 3A-3B illustrate another collapsible camper in a collapsed configuration and in an expanded configuration, according to an embodiment.
Figure 3B:
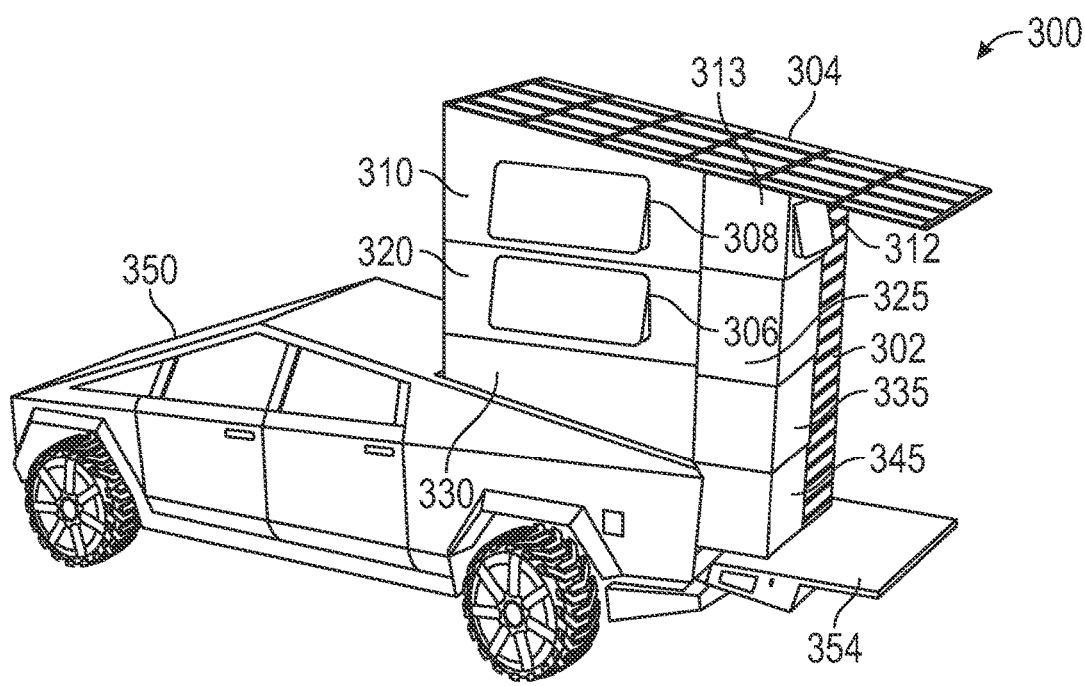

FIGS. 3A-3B illustrate another collapsible camper 300 in a collapsed configuration (FIG. 3A) and in an expanded configuration (FIG. 3B), according to an embodiment. As best seen in FIG. 3A, collapsible camper 300 can be sized and dimensioned to be stowed in a trunk or bed of a vehicle 350. Vehicle 350 can comprise a cover (e.g., a tonneau cover) 352 that slides over a roof portion of camper 300 when camper 300 is in a collapsed configuration and stowed in the vehicle trunk or bed. Vehicle 350 can comprise a rear cover 354 (e.g., a tailgate), and the cover 352, rear cover 354 and other portions of the vehicle can completely enclose camper 300 in a collapsed configuration. In some aspects, adding a collapsible camper to a vehicle can have only a minimal effect on range. Some contemplated campers described herein add zero aerodynamic drag by disappearing under a vehicle cover (e.g., a tonneau cover, tambour door, or retractable cover (e.g., steel slats that roll up and hide underneath a roof or other portion of the vehicle)) when not in use, as shown in FIG. 3A and other embodiments herein.

FIG. 3B shows collapsible camper 300 in a fully expanded configuration. Camper 300 comprises a floor, a first shell portion 310, a second shell portion 320, a third shell portion 330, and a fourth shell portion (not shown). First shell portion 310 comprises a roof portion comprising solar panels 304. Roof portion can comprise two or more portions that slide relative to one another to expand (e.g., from a configuration where roof portion has substantially the same length as an upper side edge of shell portion 310 to a configuration where roof portion has a length that is at least 10%, at least 20%, or at least 30% longer than an upper side edge of shell portion 310).

Camper 300 can comprise one or more windows 306, 308, 312, each of which can comprise a power window system as described herein and shown in FIGS. 17A-17D. In some embodiments, camper 300 can comprise a sliding door 312, which can slide, for example, up and down as in an overhead rolling door.

In some aspects, contemplated camper shells can comprise expanding portions (e.g., 325, 335, 345) that are configured to expand horizontally from one or more of the camper shell portions. As illustrated, camper shell portions can comprise three wall portions (front wall portion, and two side wall portions. However, it should be appreciated that in some embodiments, camper shell portions can comprise any suitable number of wall portions (e.g., 1, 2, 3, 4, 5, 6, 7, 8) and any suitable shape (e.g., circular, oval, pentagonal, hexagonal, octagonal). The camper shell portion can form an interior space that is fully enclosed on all sides, or partially enclosed (e.g., to couple with one or more expanding portions.

In FIG. 3B, a first expanding portion 345 can be coupled to at least one of an inner shell portion, one or more mid-shell portions (e.g., 320, 330), and the outer shell portion 310, wherein a surface (e.g., an inner surface) of the at least one of the inner shell portion, the one or more mid-shell portions, and the outer shell portion comprises a first adjustment component (e.g., a slider), wherein a surface (e.g., an outer surface) of the first expanding portion 345 comprises a second adjustment component (e.g., a complementary slider), and wherein the first adjustment component and the second adjustment component are slidably coupled to one another such that the first expanding portion is adjustable horizontally) (e.g., forwards towards the interior of camper 300 or backwards to expand the interior of camper 300), or at a range of angles relative to horizontal (e.g., between 1-35 degrees, between 1-25 degrees, between 1-15 degrees, relative to the at least one of the inner shell portion, the one or more mid-shell portions, and the outer shell portion. A second expanding portion 335 can be coupled to at least one of an inner shell portion, one or more mid-shell portions (e.g., 320, 330), and the outer shell portion 310, wherein a surface (e.g., an inner surface) of the at least one of the inner shell portion, the one or more mid-shell portions, and the outer shell portion comprises a third adjustment component (e.g., a slider), wherein a surface (e.g., an outer surface) of the second expanding portion 335 comprises a fourth adjustment component (e.g., a complementary slider), and wherein the third adjustment component and the fourth adjustment component are slidably coupled to one another such that the first expanding portion is adjustable horizontally (e.g., forwards towards the interior of camper 300 or backwards to expand the interior of camper 300) relative to the at least one of the inner shell portion, the one or more mid-shell portions, and the outer shell portion. A third expanding portion 325 can be coupled to at least one of an inner shell portion, one or more mid-shell portions (e.g., 320, 330), and the outer shell portion 310, wherein a surface (e.g., an inner surface) of the at least one of the inner shell portion, the one or more mid-shell portions, and the outer shell portion comprises a fifth adjustment component (e.g., a slider), wherein a surface (e.g., an outer surface) of the third expanding portion 325 comprises a sixth adjustment component (e.g., a complementary slider), and wherein the fifth adjustment component and the sixth adjustment component are slidably coupled to one another such that the first expanding portion is adjustable horizontally (e.g., forwards towards the interior of camper 300 or backwards to expand the interior of camper 300) relative to the at least one of the inner shell portion, the one or more mid-shell portions, and the outer shell portion. A fourth expanding portion 315 can be coupled to at least one of an inner shell portion, one or more mid-shell portions (e.g., 320, 330), and the outer shell portion 310, wherein a surface (e.g., an inner surface) of the at least one of the inner shell portion, the one or more mid-shell portions, and the outer shell portion comprises a seventh adjustment component (e.g., a slider), wherein a surface (e.g., an outer surface) of the fourth expanding portion 315 comprises a eighth adjustment component (e.g., a complementary slider), and wherein the seventh adjustment component and the eighth adjustment component are slidably coupled to one another such that the first expanding portion is adjustable horizontally (e.g., forwards towards the interior of camper 300 or backwards to expand the interior of camper 300) relative to the at least one of the inner shell portion, the one or more mid-shell portions, and the outer shell portion.

It should be appreciated that the expanding portions can comprise two side wall portions and a real wall portion (as shown in FIG. 3B), or can comprise any other suitable number of wall portions. It should also be appreciated that the expanding portions can be coupled to one another in a manner similar to the shell portions described herein such that they can collapse and expand vertically with the shell portions.

All suitable adjustment components are contemplated herein, including for example, drawer slide or linear slide mechanisms that are powered. Such mechanism can couple the motion between the main panel segments (shell portions) and the slide out segments (expanding portions).

Contemplated camper shells can have no expanding portions or any suitable number of expanding portions (e.g., 2-5, 2-10). In some aspects, the number of expanding portions can match the number of shell portions. In some aspects, the number of expanding portions can be 1 less than the number of shell portions. In some aspects, the number of expanding portions can be 1 greater than the number of shell portions. In some aspects, the number of expanding portions can be up to 2 less than the number of shell portions. In some aspects, the number of expanding portions can be up to 2 greater than the number of shell portions. In some aspects, the number of expanding portions can be up to 3 less than the number of shell portions. In some aspects, the number of expanding portions can be up to 3 greater than the number of shell portions. The expanding portions can be configured to increase a front-to-back length of camper 300 by, for example, between 0.5-8 feet, between 1-5 feet, between 0.5 and 3 feet, or any other suitable amount.

It should be appreciated that camper 300 can comprise any suitable interior accessory or component (e.g., adjustable bed 700, console, vanity, sink, stovetop) described herein. It should also be appreciated that camper 300 can comprise any suitable mechanism for expanding and collapsing camper 300 (e.g., lift system 1500 and other mechanisms described herein). The shell portions can be coupled to one another in any suitable manner, including as described in connection with shell portions of camper 100 and 200. The shell portions of camper 300 can be similar to shell portions of camper 100 and camper 200, for example, in one or more of height, length, size and shape. In some aspects, shell portions of camper 300 can differ from shell portions 100 and camper 200 in one or more ways, for example, excluding real wall portions such that the side wall portions are sized and dimensioned to receive side wall portions of expanding portions.

Figure 4:
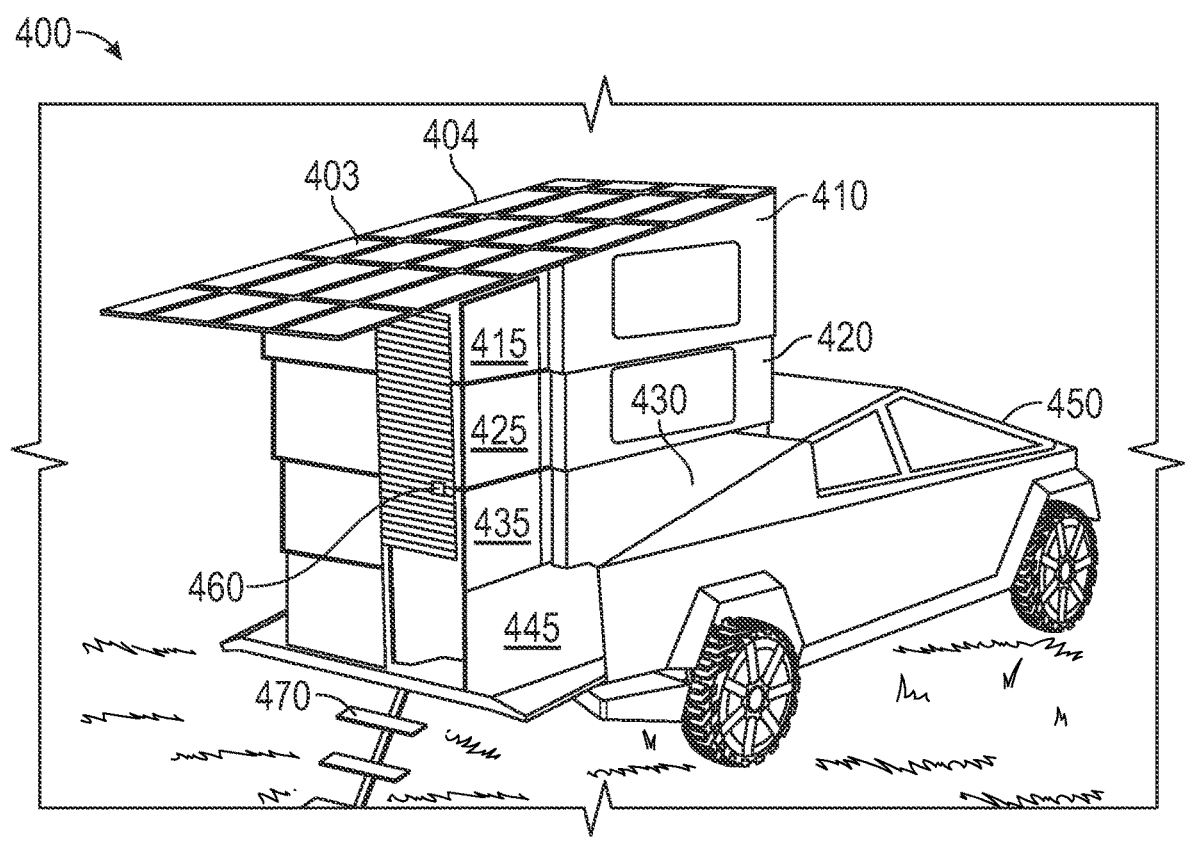
FIG. 4 illustrates another collapsible camper, according to an embodiment.

FIG. 4 illustrates another collapsible camper, according to an embodiment. Camper 400 can be sized and dimensioned to fit within an enclosed truck bed or trunk of vehicle 450 when in a collapsed configuration. In an expanded configuration, as shown in FIG. 4, camper 400 comprises an inner shell portion that forms a bottom shell portion, a first mid-shell portion 430 above inner shell portion, a second mid-shell portion 420 above first mid-shell portion 430, and an outer shell portion 410 that form an upper shell portion. Expander portion 445 comprises a rear wall portion and two side portions that slidably couple to inner surfaces of inner shell portion, expander portion 435 comprising a rear wall portion and two side portions that slidably couple to inner surfaces of first mid-shell portion 430, expander portion 425 comprising a rear wall portion and two side portions that slidably couple to inner surfaces of second mid-shell portion 420, and expander portion 415 comprising a rear wall portion and two side portions that slidably couple to inner surfaces of outer shell portion 410. Expander portions 445, 435, 425, 415 can be configured such that at least 70%, at least 80%, or at least 90% of their side wall portions are positioned within the shell portions when in a collapsed configuration, and such that at least 70%, at least 80% or a least 90% of their side wall portions extend back beyond a rear edge of the shell portions when in an expanded configuration. In some aspects, the real wall portions of expander portions 445, 435, 425, 415 can comprise a door 460 (e.g., a sliding door). Outer shell 415 of camper 415 can comprise or be coupled to a roof portion. In some embodiments, the roof portion can comprise solar panels 403, 404. In some aspects, solar panels 403 and 404 are slidably coupled to one another. In some aspects, roof portion having solar panels 403, 404 comprise two or more panels that are slidably coupled to one another.

As illustrated in FIG. 4, camper 400 can comprise one or more windows (e.g., 1, 2, 3, 4, 5, 6, 7, 8, or more windows). A set of stairs 470 can be provided and extend from (and collapse into) a portion of camper 400 (e.g., a floor of camper 400).

It should be appreciated that camper 400 can comprise any suitable interior accessory or component (e.g., adjustable bed, console, vanity, sink, stovetop) described herein. It should also be appreciated that camper 400 can comprise any suitable mechanism for expanding and collapsing camper 400 (e.g., lift system 1500 and other mechanisms described herein). The shell portions of camper 400 can be similar to shell portions of camper 300.

Figure 5:
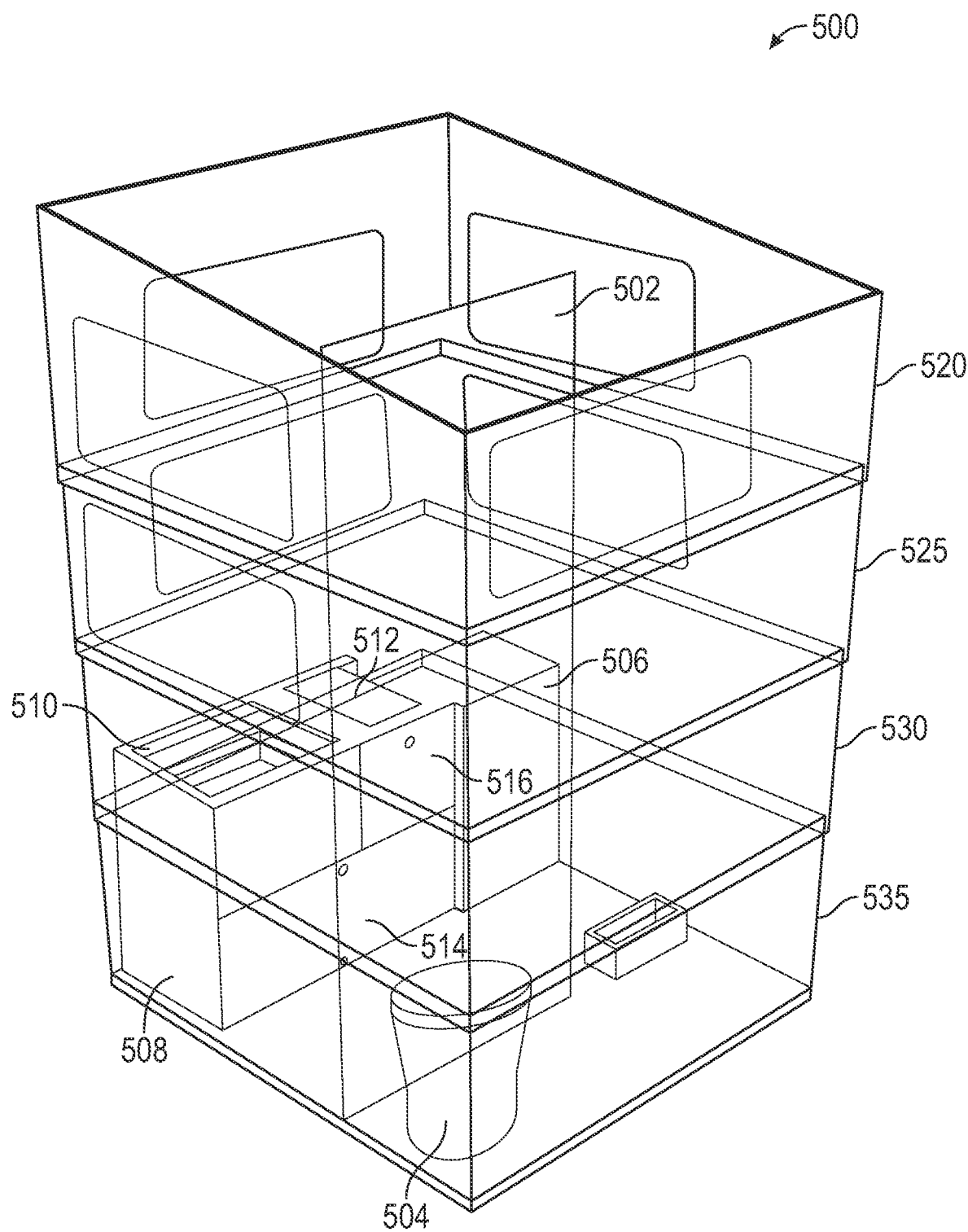
FIG. 5 illustrates an interior of a camper similar to camper 100 of FIG. 1.
Figure 6:
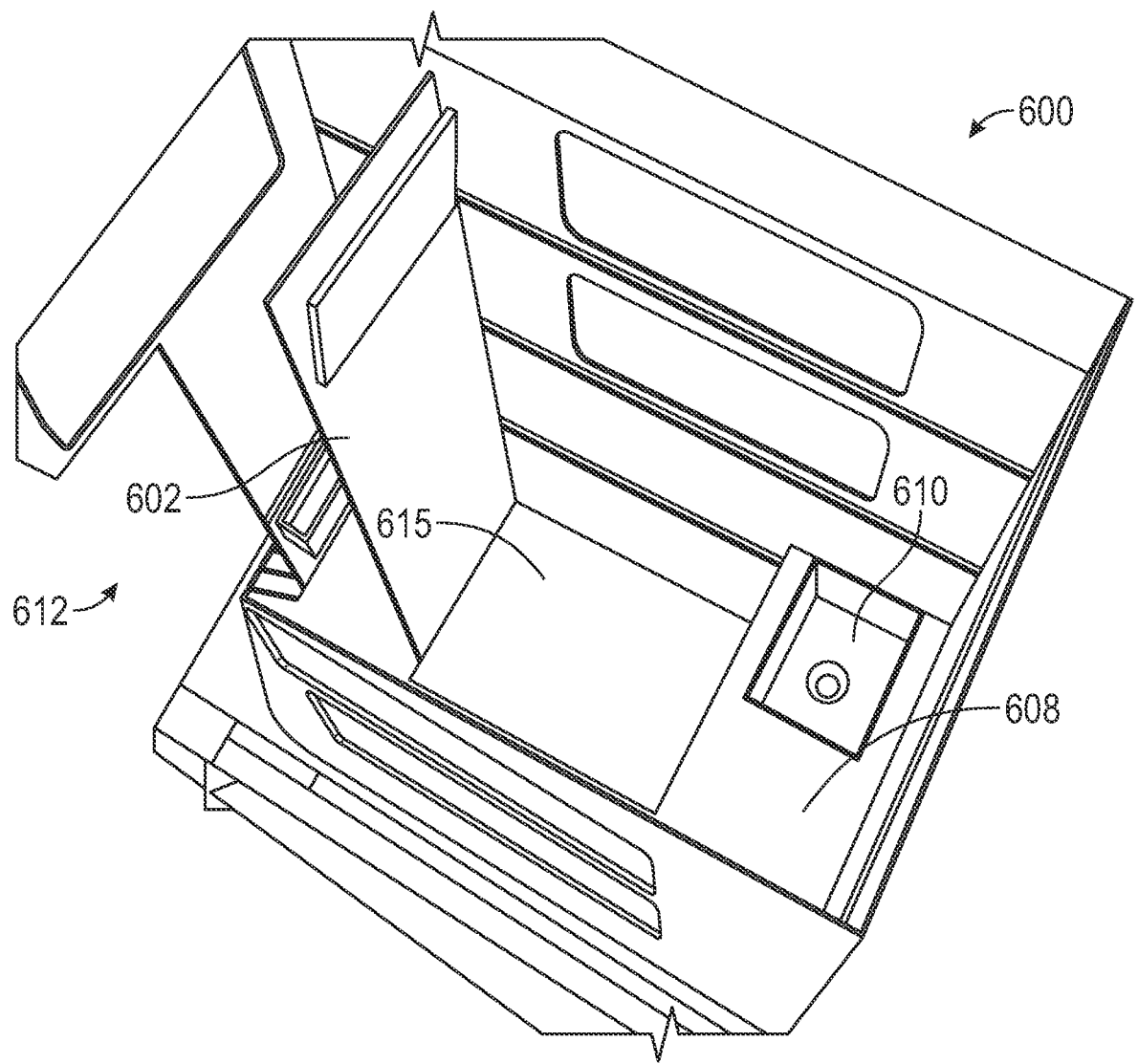
FIG. 6 illustrates another interior of another camper, according to an embodiment.

FIG. 5 illustrates the interior of a camper 500 (with camper shell portions 520, 525, 530, 535 being transparent for illustrative purposes. The interior of camper 500 can also have various features, accessories, and appliances. For example, the interior of camper 500 can include a partition 502 that divides the interior into two sections. One section can include a toilet 504, and another section can comprise a refrigerator 506 and a console 508 that can include a sink 510, a stove top 512, and drawers 514 and 516. In other embodiments, console 508 can comprise refrigerator 506. FIG. 6 illustrates the interior of another camper 600, which comprises a floor 615 (which can comprise a heated floor), a partition 602, a console 608 optionally comprising a sink 610, and a door 612 to exit camper 600. While only a few interior components are shown in FIGS. 5-6 for illustrative purposes, it should be appreciated that campers of the disclosure can comprise any suitable component typically found in a dwelling such as a trailer (e.g., table, chair, closet, bed, television, retractable stairs, pivoting tables, free standing chairs, wall mounted chairs, removable chairs). The campers, camper shells and other components and accessories described herein can be provided for campers or for any other suitable dwelling, including, for example, trailers, mobile offices, mobile businesses and the like. Thus, it should be appreciated that the campers described herein (e.g., in connection with FIGS. 2A and 2B, FIG. 5, FIG. 6 or any other figures) can be considered other dwellings (e.g., trailers, mobile office (e.g., mobile doctor's office), mobile business (e.g., mobile pet grooming, mobile locksmith, mobile coffee truck, mobile food truck).

In some embodiments, a shell of the disclosure (e.g., standalone, standalone with lift system, or a shell of a dwelling) can comprise shells having one or more edge trims. In some aspects, one or more shell portions of a shell can comprise one or more of a lower edge trim and an upper edge trim. An upper edge trim coupled to an upper edge of a shell portion can comprise a lower leg. The lower leg can be spaced apart from at least one of another portion of the edge trim and the shell portion when the upper edge trim is coupled to the shell portion, leaving a small gap. A lower edge trim coupled to a bottom edge of a shell portion can comprise an upper leg. The upper leg can be spaced apart from at least one of another portion of the edge trim and the shell portion when the lower edge trim is coupled to the shell portion. In some aspects, when a camper shell is being expanded (from a collapsed configuration), the upper leg of a lower edge trim of a first shell portion can engage or be engaged a lower leg of an upper edge trim of a second shell portion (e.g., a shell portion behind or in front of the first shell portion) and pull up (or assist in pulling up) the second shell portion when the camper shell is adjusted from the collapsed configuration to the extended configuration. The upper leg of a lower edge trim can engage or be engaged by a lower leg of an upper edge trim, for example, by moving into a position between the lower leg and the second shell portion. In some aspects, contemplated edge trims can comprise one or more slots, for example, a T-slot configured to receive a portion of an accessory mount.

Contemplated edge trims can be positioned along a bottom or lower edge portion or a shell portion, an upper edge portion, a right side edge portion, a left side edge portion, or any other portion of a shell portion having any suitable size and shape. In some aspects, a shell portion can comprise 1, 2, 3, 4, 5, between 1-10, between 1-5, between 1-4, one or more, or any other suitable number of upper edge trims positioned along at least 10%, at least 20%, at least 30%, at least 40%, at least 50%, at least 60%, at least 70%, at least 80%, at least 90%, at least 95%, or 100% of an upper edge of a shell portion. For example, a single upper edge trim can extend over at least 10%, at least 20%, at least 30%, at least 40%, at least 50%, at least 60%, at least 70%, at least 80%, at least 90%, at least 95%, or 100% of the upper edge of a shell portion. As another example, three upper edge trims can be provided over at least 10%, at least 20%, at least 30%, at least 40%, at least 50%, at least 60%, at least 70%, at least 80%, at least 90%, at least 95%, or 100% of the upper edge of a shell portion (e.g., where a shell portion has three wall portions, with one edge trim extending over at least 10%, at least 20%, at least 30%, at least 40%, at least 50%, at least 60%, at least 70%, at least 80%, at least 90%, at least 95%, or 100% of an upper edge of a wall portion (e.g., side wall, front wall, rear wall) of the shell portion). As yet another example, four upper edge trims can be provided over at least 10%, at least 20%, at least 30%, at least 40%, at least 50%, at least 60%, at least 70%, at least 80%, at least 90%, at least 95%, or 100% of the upper edge of a shell portion (e.g., where a shell portion has four wall portions). In some aspects, a shell portion can comprise 1, 2, 3, 4, 5, between 1-10, between 1-5, between 1-4, one or more, or any other suitable number of lower edge trims positioned along at least 10%, at least 20%, at least 30%, at least 40%, at least 50%, at least 60%, at least 70%, at least 80%, at least 90%, at least 95%, or 100% of an lower edge of a shell portion. For example, a single lower edge trim can extend over at least 10%, at least 20%, at least 30%, at least 40%, at least 50%, at least 60%, at least 70%, at least 80%, at least 90%, at least 95%, or 100% of the lower edge of a shell portion. As another example, three lower edge trims can be provided over at least 10%, at least 20%, at least 30%, at least 40%, at least 50%, at least 60%, at least 70%, at least 80%, at least 90%, at least 95%, or 100% of the lower edge of a shell portion (e.g., where a shell portion has three wall portions, with one edge trim extending over at least 10%, at least 20%, at least 30%, at least 40%, at least 50%, at least 60%, at least 70%, at least 80%, at least 90%, at least 95%, or 100% of an lower edge of a wall portion (e.g., side wall, front wall, rear wall) of the shell portion). As yet another example, four lower edge trims can be provided over at least 10%, at least 20%, at least 30%, at least 40%, at least 50%, at least 60%, at least 70%, at least 80%, at least 90%, at least 95%, or 100% of the lower edge of a shell portion (e.g., where a shell portion has four wall portions). In some aspects, a shell portion can comprise 1, 2, 3, 4, 5, between 1-10, between 1-5, between 1-4, one or more, or any other suitable number of edge trims positioned along at least 10%, at least 20%, at least 30%, at least 40%, at least 50%, at least 60%, at least 70%, at least 80%, at least 90%, at least 95%, or 100% of an edge of a shell portion.

In some aspects, an edge trim can be made of aluminum. However, it should be appreciated that contemplated edge trims can be made of any suitable materials (e.g., one or more of PVC, steel, magnesium, composite, polymers, titanium). The edge trims can be configured to "grab" subsequent levels or shell portions. For example, as the shell portions are raised up, the lower edge trim(s) of a shell portion can grab and interlock with upper edge trim(s) of a subsequent shell portion, pulling it up as well.

Figure 9:
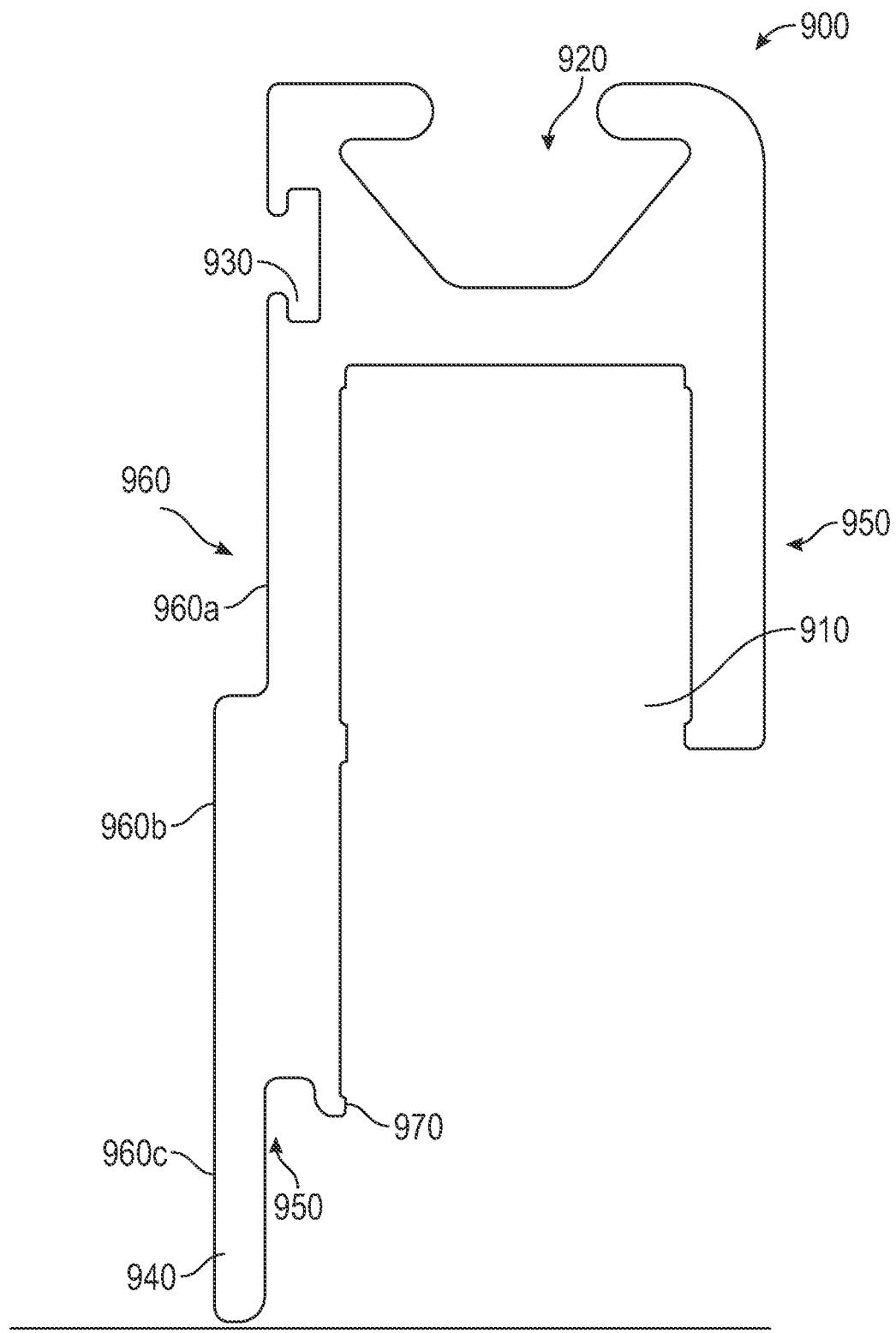
FIG. 9 illustrates an exemplary edge trim, according to an embodiment.

FIG. 9 illustrates an exemplary edge trim, according to an embodiment. Edge trim 900 can be used along any portion of a shell portion, for example, an upper edge, a lower edge, a side edge, a rounded edge, a straight edge, etc. As shown in FIG. 9, edge trim 900 can be positioned around an upper edge portion of a shell portion. However, for example if flipped 180 degrees, edge trim 900 can be positioned around a lower edge portion of a shell portion. Edge trim 900 comprises a slot 910 sized and dimensioned to receive an edge portion of a shell portion or panel. The slot comprises a first piece 950 that extends over a first portion of a shell portion (e.g., an interior facing portion of a shell portion), and a second piece 960 that extends over a second portion of a shell portion (e.g., an exterior facing portion of the shell portion). The second piece can be longer than the first piece in some embodiments, and can comprise a leg 940 that forms a slot 950 between leg 940 and the shell portion in slot 910. In some aspects, the second piece 960 can comprise a first subsection 960a (e.g., substantially aligned with the first piece), a second subsection 960b, and a third subsection 960c. The first subsection can be thinner than the second subsection, with a step formed between first subsection and the second subsection. The second subsection can have an outer side that faces away from the panel in slot 910, and an inner side that faces the panel in slot 910. The third subsection 960c can comprise leg 940, which can be thinner than the second subsection 960b. In some aspects, an outer side of leg 940 is continuous with the outer side of the second subsection. Slot 950 can be formed between leg 940 and at least one of the shell portion in 910 an a protrusion 970 of the third portion (e.g., a protrusion that extends from an inner side of the second portion). Edge trim 900 can comprise several slots sized and dimensioned to receive components such as accessory mounts, a brush seal, etc., including, for example, a T-slot 920, and slot 930. In some aspects, slot 930 can be used to integrate a brush seal that can prevent debris from getting lodged in between the shell portion and the edge trim. In some aspects, an integrated T-slot 920 for mounting accessories is provided. In some aspects, a slot of an edge trim can be configured to hold a T-slot nut. An example of an accessory mounted to a camper shell or other shell via a slot of an edge trim can be found in FIGS. 13A-13C. While a TV and TV mount is shown in FIGS. 13A-13C, it should be appreciated that a variety of components and accessories can be mounted via T-slot 920, including for example, an adjustable bed (e.g., adjustable bed of FIGS. 7A-7E), cupholders, mobile phones, mobile computing devices, computing devices, shelves, tents, and frames. Such components and accessories can be mounted to an interior or exterior of the camper.

Figure 11:
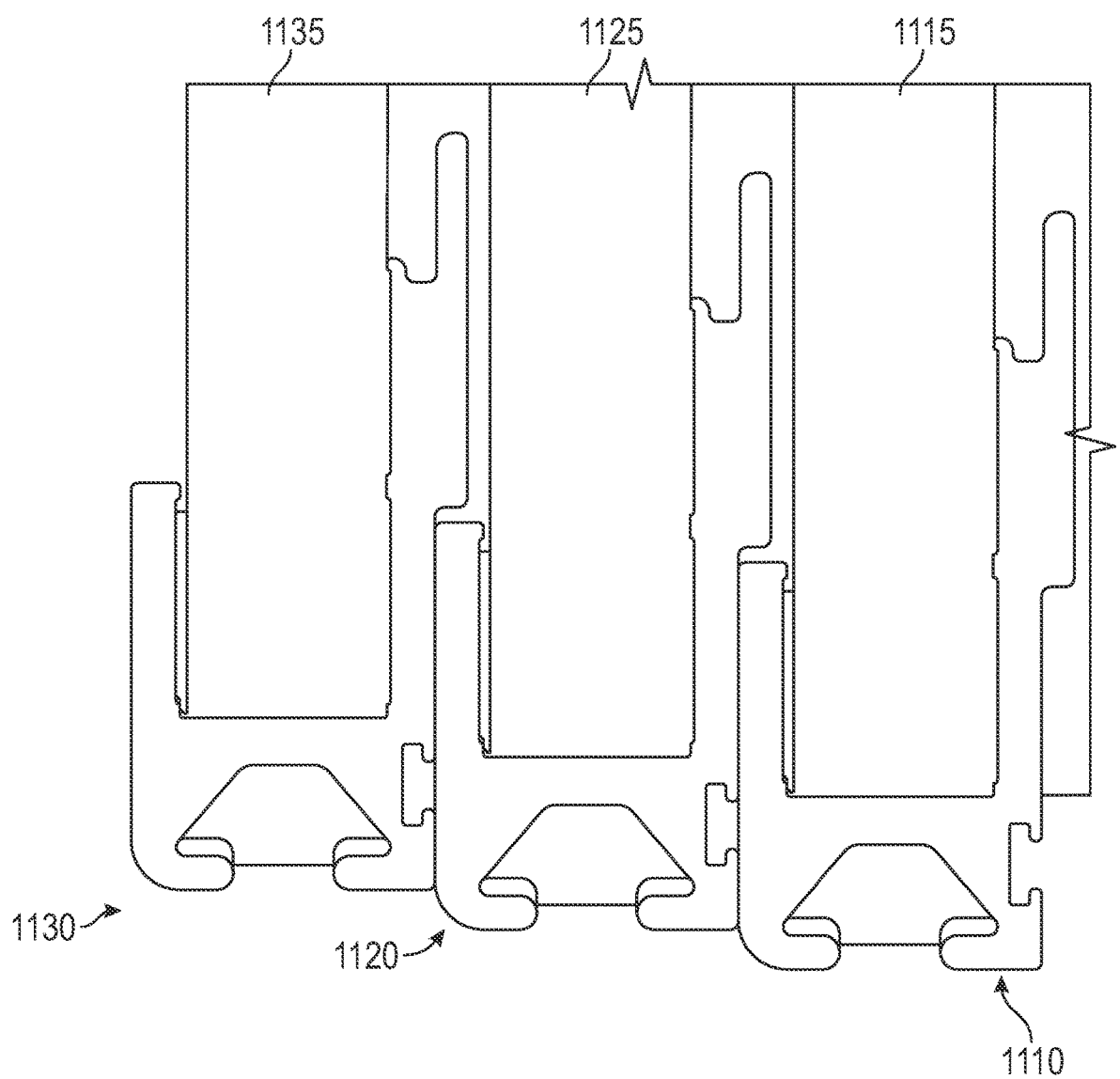
FIG. 11 illustrates a lower portion of a set of shell portions in a collapsed configuration having lower edge trims, according to an embodiment.

The edge trims described herein can advantageously provide a seal. The edge trims can interlock quite tightly, creating a natural seal to keep out bugs, water, and minimize thermal losses. Additionally or alternatively the edge trims described herein can provide extra rigidity. For example, the long run of edge trim on the upper and lower edges of the shell portions can make the shell portions much stiffer. When a camper shell having the edge trims described herein is in a collapsed configuration, the edge trims can lock together (as shown in FIG. 11) to provide rigidity. The edge trims described herein can be used to hide wiring, for example, wiring underneath the edge trim in a shell portion cutout. Additionally or alternatively, one or more cavities may be provided in the edge trim for the wiring to reside in.

Figure 10:
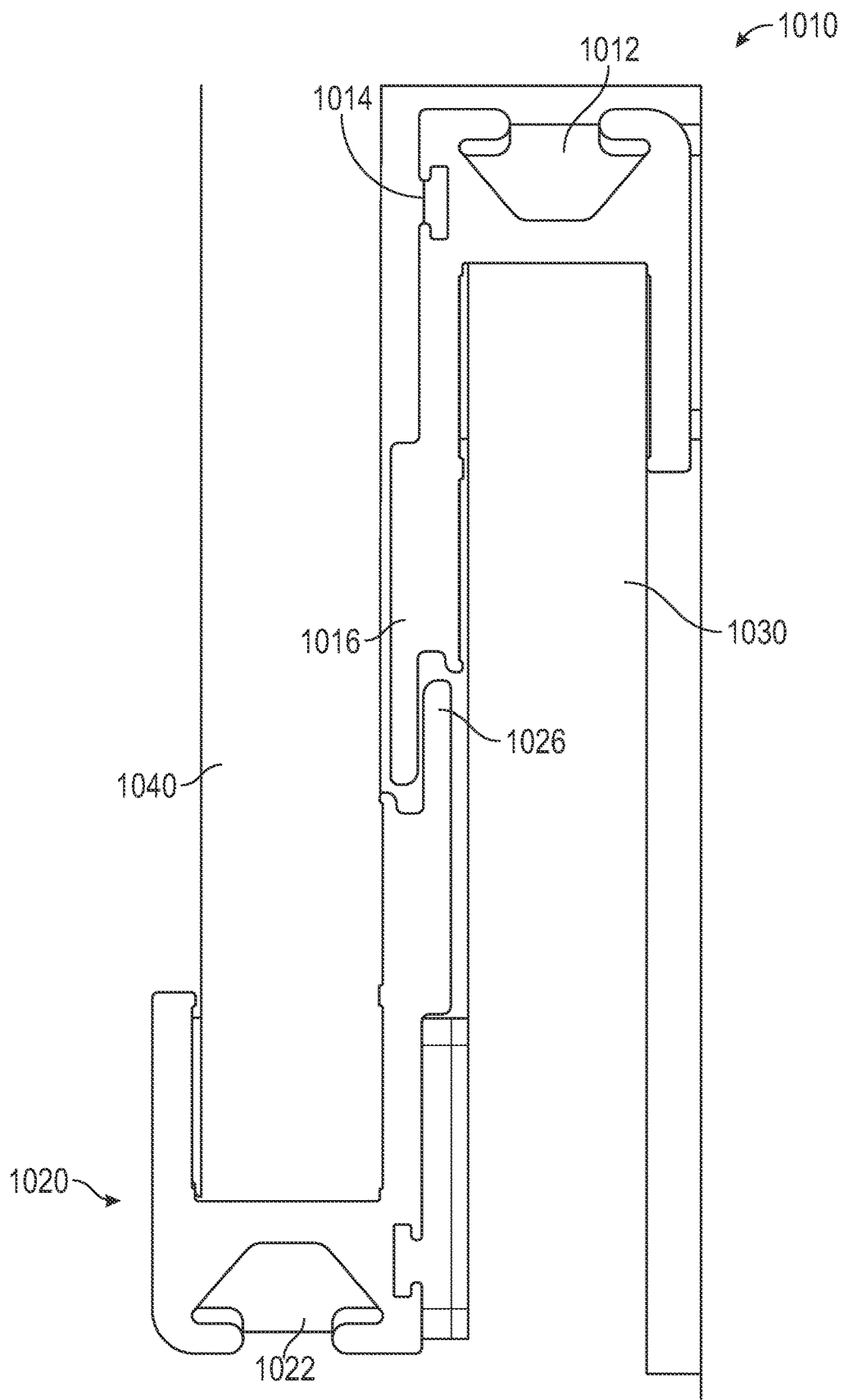
FIG. 10 illustrates an upper edge trim and a lower edge trim, according to an embodiment.

FIG. 10 illustrates an upper edge trim and a lower edge trim (each of which can be identical or substantially identical to edge trim 900), according to an embodiment. While the upper edge trim and lower edge trim in FIG. 10 are shown as being identical or substantially identical, it should be appreciated that in some embodiments, an upper edge trim and a lower edge trim can be substantially different from one another (e.g., in size, shape, length, number of slots). In some embodiments, an upper edge trim of a shell portion and a lower edge trim of adjacent shell portions can have leg portions and slots (e.g., between leg portion and shell portion) that engage one another.

Edge trim 1010 is positioned around an upper edge portion of shell portion 1030. Edge trim 1020 is positioned around a lower edge portion of panel 1040. Edge trim 1010 comprises a first slot 1012, a second slot 1014, and leg 1016. Edge trim 1020 comprises a first slot 1022 and leg 1026. FIG. 10 illustrates edge trims 1010 and 1020 just before they are locked together while the camper shell (comprising shell portions 1030 and 1040) is expanding (being raised up).

FIG. 11 illustrates a lower portion of a set of shell portions (inner shell portion 1115, mid-shell portion 1125, and outer shell portion 1135) in a collapsed configuration having lower edge trims 1110, 1120, and 1130 (each of which can be identical or substantially identical to edge trim 900) positioned around lower edge portions of shell portions 1115, 1125, 1135, respectively, according to an embodiment.

It should be appreciated that the edge trims of FIGS. 9-11 can be used in connection with any shell portion described herein, including the shell portions of camper 100, camper 200, camper 300, or camper 400, or any shell portions of any dwelling (e.g., trailer, RV, mobile business, mobile office). It should also be appreciated that the edge trims of FIGS. 9-11 can be used in connection with any expanding portion (e.g., expanding portions 315, 325, 335, 345, 415, 425, 435, and 445).

Figure 12:
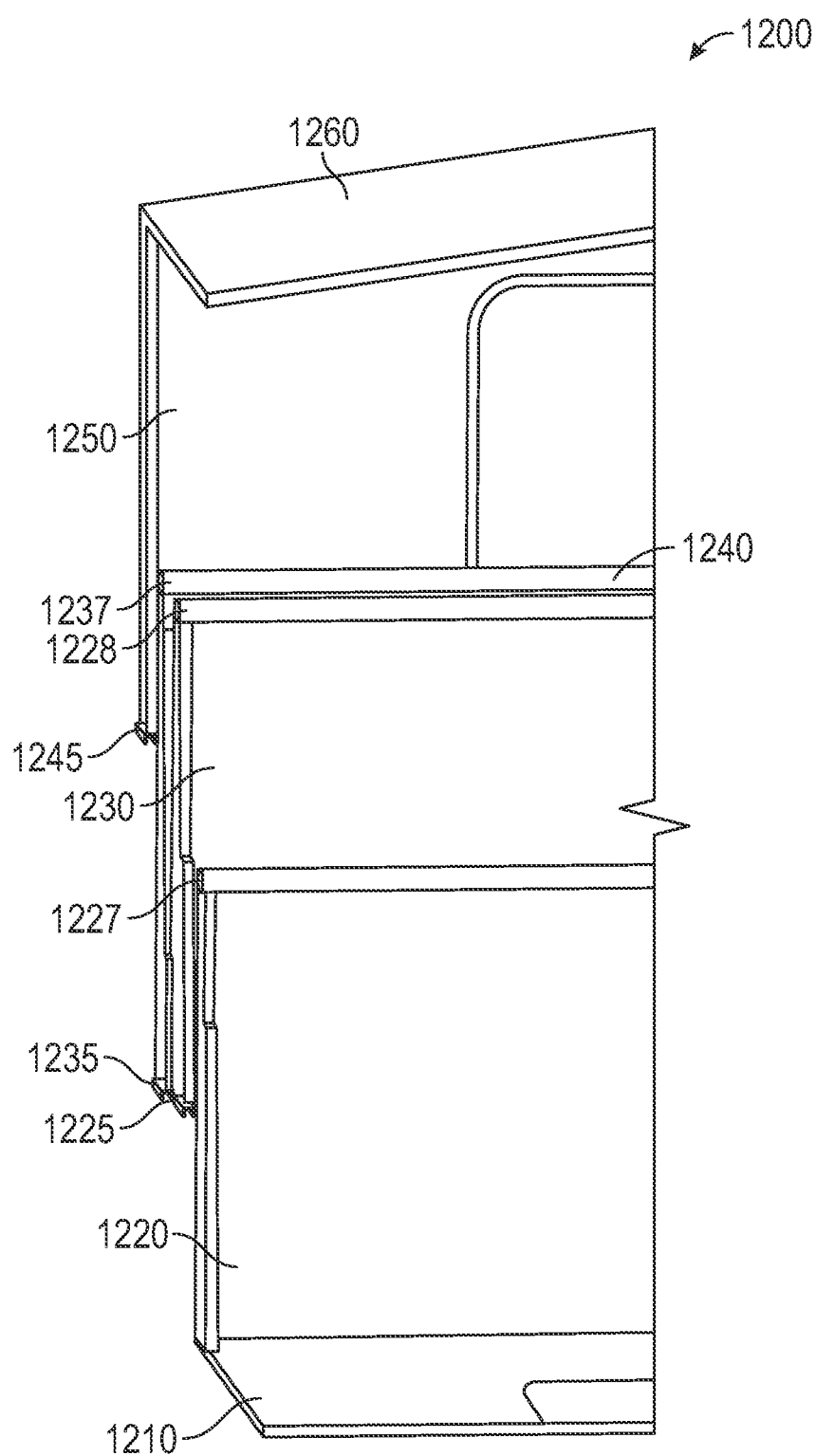
FIG. 12 illustrates portions of a set of shell portions having edge trims, according to an embodiment.

FIG. 12 illustrates a portion of a camper shell 1200 positioned on a ground or flooring 1210, with a set of shell portions 1220, 1230, 1240, 1250 having edge trims, according to an embodiment. Inner shell portion 1220 comprises an upper edge trim 1227, first mid-shell portion 1230 comprises a lower edge trim 1225 and upper edge trim 1228, second mid-shell portion 1240 comprises a lower edge trim 1235 and upper edge trim 1237, and outer shell portion 1250 comprises a lower edge trim 1245 and a roof portion 1260. As outer shell portion 1250 rises up, lower edge trim 1245 interlocks with upper edge trim 1237 to assist in pulling up second mid-shell portion 1240. As second mid-shell portion 1240 is being raised, lower edge trim 1235 interlocks with upper edge trim 1228 to assist in pulling up first mid-shell portion 1230. As first mid-shell portion 1230 is being raised, lower edge trim 1225 interlocks with upper edge trim 1227.

It should be appreciated that any suitable mechanism can be used to expand camper shell 1200 from a collapsed configuration to an expanded configuration, including the lift systems and other mechanisms as described herein.

Figure 14B:
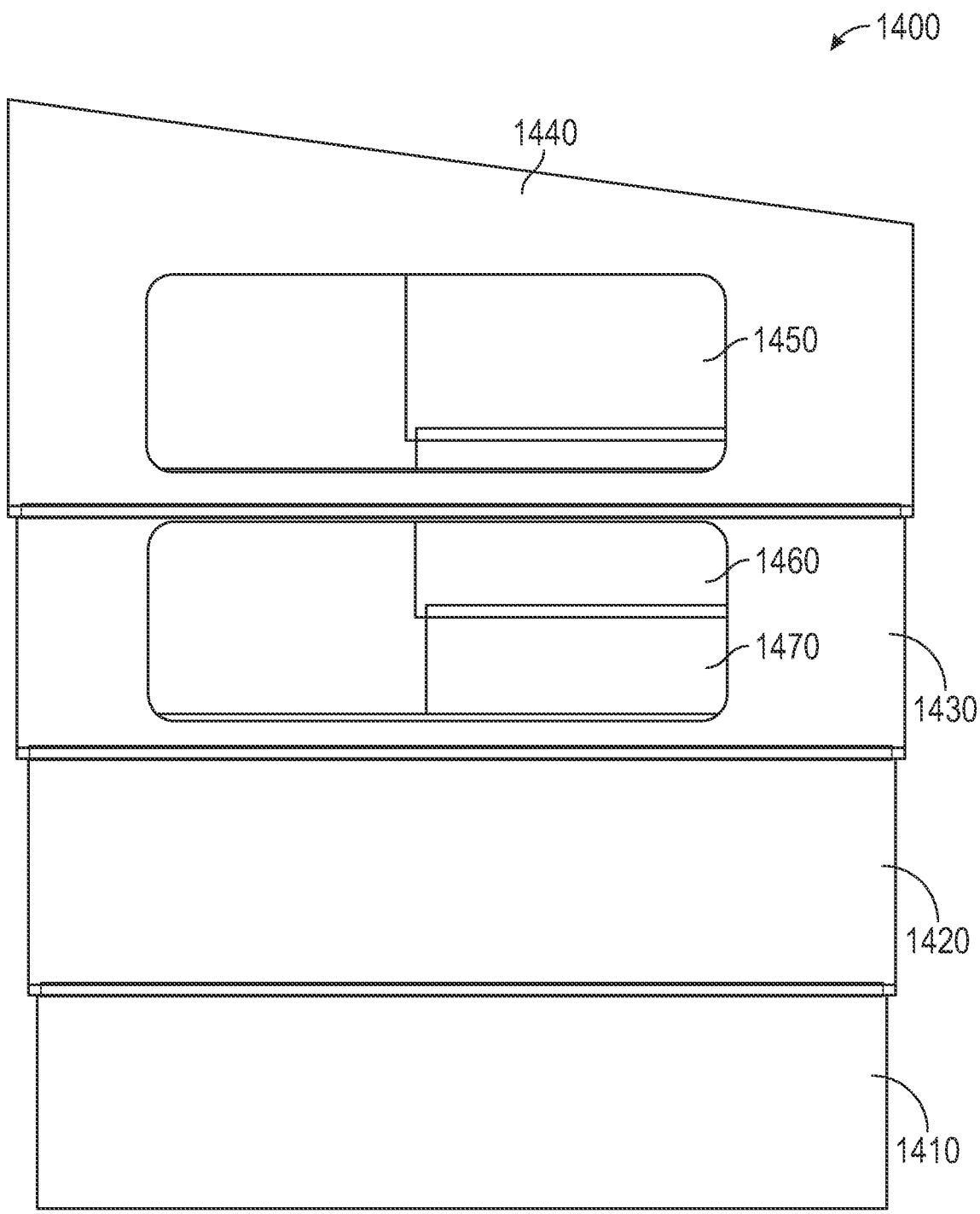
Figure 14C:
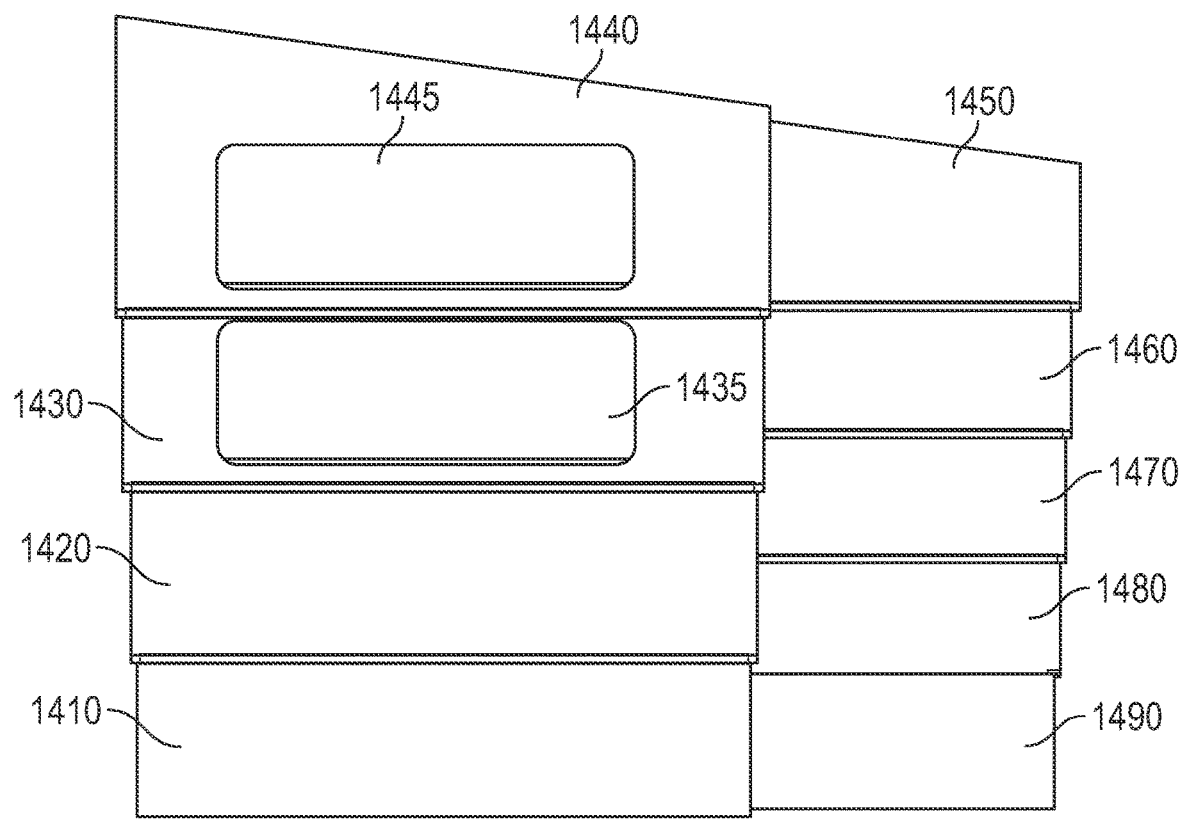

FIGS. 14A-14C illustrate a camper shell (or other dwelling shell) expanding vertically and horizontally, according to an embodiment. As shown in FIG. 14A, the shell 1400 is in a collapsed configuration with outer shell portion 1140 covering all or substantially all of the other shell portions. FIG. 14B illustrates camper shell 1400 in a fully vertically expanded configuration but horizontally collapsed. Outer shell portion 1440 is positioned above second mid-shell portion 1430, which is positioned above first mid-shell portion 1420, which is positioned above inner shell portion 1410. Outer shell portion 1440 comprises a window 1445 through which portions of expander portions 1450 and 1460 can be seen. Second mid-shell portion 1430 comprises a window 1435 through which portions of expander portions 1460 and 1470 can be seen. FIG. 14C illustrates camper shell 1400 in a fully vertically expanded and fully horizontally expanded configuration wherein at least 50%, at least 60%, at least 70%, at least 80%, or at least 90% of expander shell portions 1450, 1460, 1470, 1480, and 1490 extend out of shell portions 1410, 1420, 1430, and 1440.

Lift System

In some aspects, a lift system is provided, which can be used to lift or expand various objects (e.g., a collapsible camper shell as described herein). A lift system can comprise a base extending between a first bracket and a second bracket, the base comprising a first elongated housing coupled to a first bracket, a second elongated housing coupled to a second bracket, a carriage positioned in the first elongated housing, the carriage coupled to a spring, and a motor coupled to the carriage. The lift system can further comprise a first telescoping arm coupled to the first bracket, a second telescoping arm coupled to the second bracket, wherein the spring is positioned at least partially in each of the first elongated housing, the first bracket, and the first telescoping arm, and wherein the motor is configured to cause the carriage to move in a first direction through the first elongated housing, which moves the spring in the first direction and causes the first telescoping arm to extend from a telescoped arm configuration to an extended arm configuration.

The lift systems described herein can comprise a translation element coupled to a motor, and the carriage can comprise a threaded opening comprising threads complementary to threads of the translation element. The motor can be configured to drive the translation element to cause the carriage to move in the first direction. In some aspects, a second elongated housing coupled to a second bracket is provided. A second carriage can be positioned in the second elongated housing, the second carriage coupled to a second spring, and a second motor coupled to the second carriage, wherein the second spring is positioned at least partially in each of the second elongated housing, the second bracket, and the second telescoping arm, and wherein the second motor is configured to cause the second carriage to move in a second direction through the second elongated housing (e.g., via a translation element), which moves the second spring in the second direction and causes the second telescoping arm to extend from a telescoped arm configuration to an extended arm configuration. In some aspects, the telescoping arms can have the same or different maximum lengths. For example, the second telescoping arm can be shorter, the same length as, or longer than the first telescoping arm when the first and second telescoping arms are in fully extended arm configurations.

While lift systems are generally described as having two sets of components (e.g., arms, elongated housings, carriages, springs, motors, translation elements), it should be appreciated that contemplated lift systems can comprise any suitable number of any components (e.g., up to 3 arms, up to 4 arms, up to 5 arms, up to 10 arms, up to 3 motors, up to 4 motors, up to 5 motors, up to 10 motors, up to 3 brackets, up to 4 brackets, up to 5 brackets, up to 10 brackets, up to 3 springs, up to 4 springs, up to 5 springs, to 10 springs, up to 3 translation elements, up to 4 translation elements, up to 5 translation elements, up to 10 translation elements, up to 3 carriages, up to 4 carriages, up to 5 carriages, up to 10 carriages).

Figure 15A:
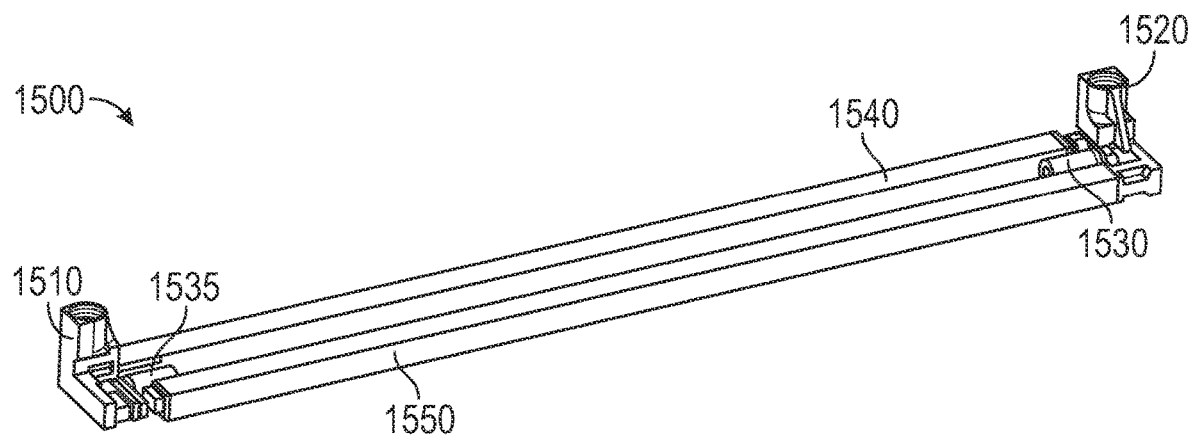
FIGS. 15A-15D illustrate a lift system and components thereof, according to an embodiment.
Figure 15B:
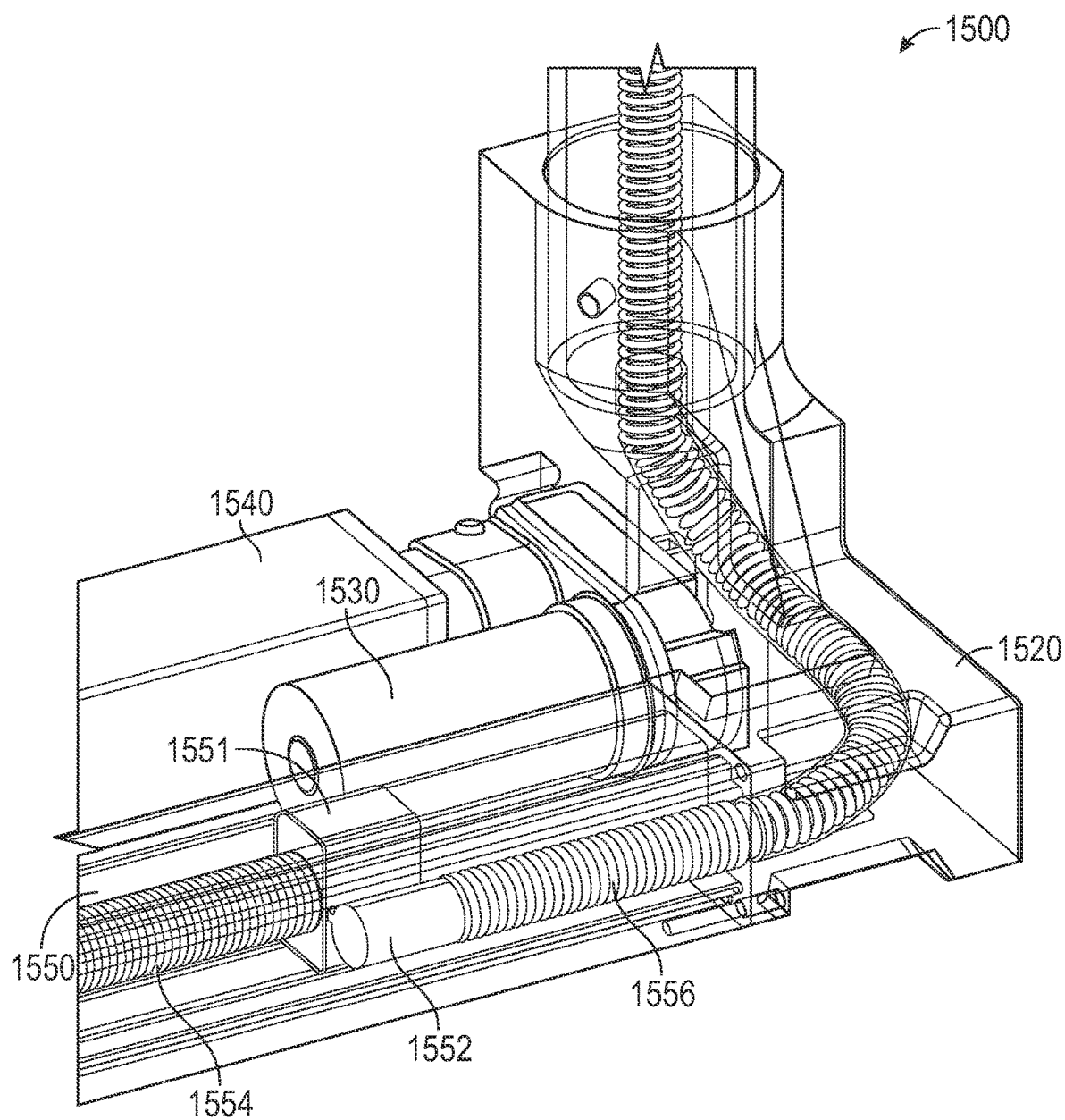
Figure 15C:
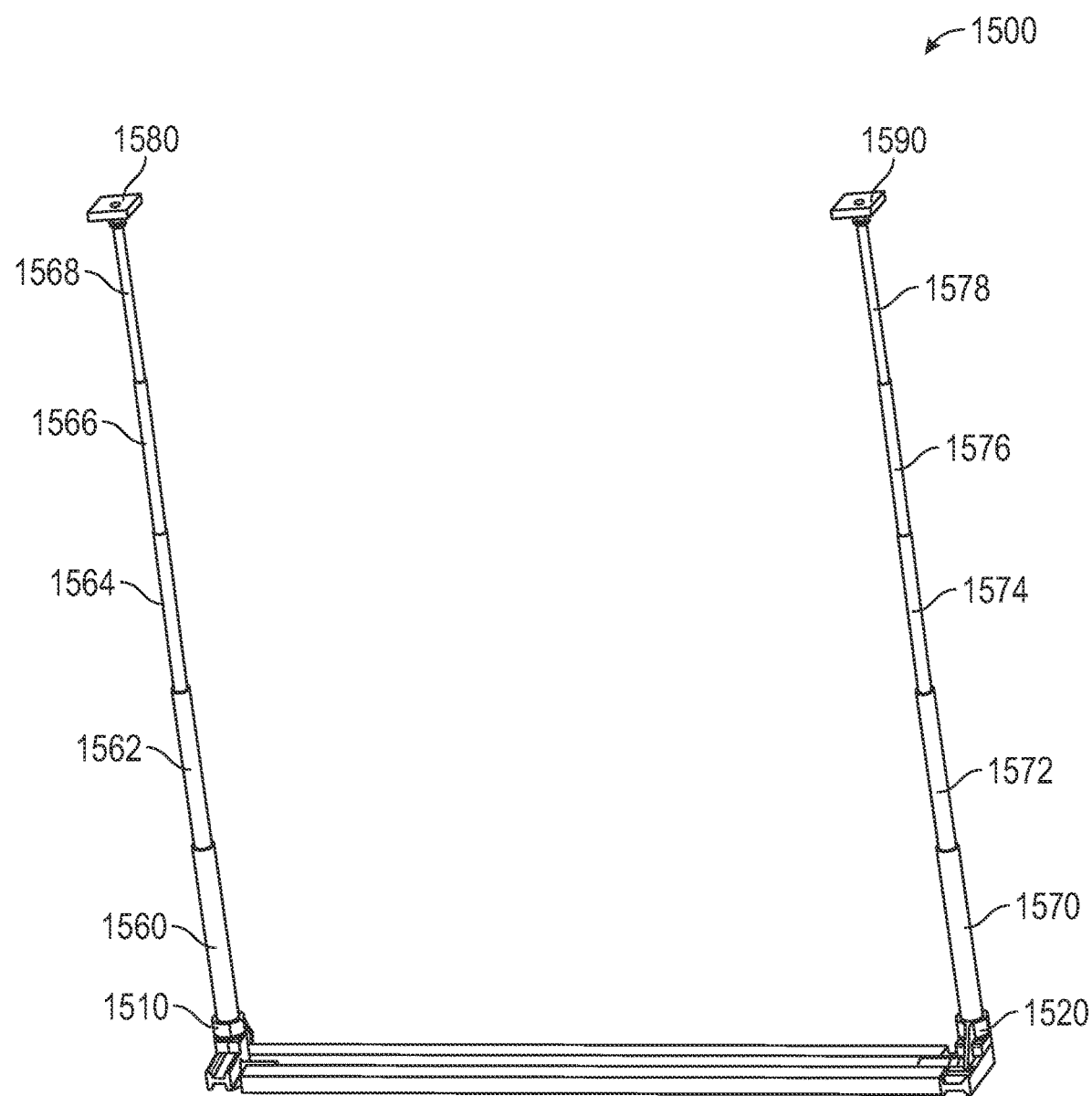

FIGS. 15A-15D illustrate a lift system and components thereof, according to an embodiment. Lift system 1500 comprises a base that includes a first bracket 1510, a second bracket 1520, a first elongated housing 1540 coupled to at least first bracket 1510, and a second elongated housing 1550 coupled to at least second bracket 1520. One or more motors (e.g., first motor 1530 and second motor 1535) are provided. As best seen in FIG. 15C, a first telescoping arm 1560 can be coupled to first bracket 1510. First telescoping arm can comprise various segments (e.g., 1562, 1564, 1566, 1568) and be configured to collapse and expand. One segment (e.g., an innermost segment of telescoping arm 1560) can comprise a first platform 1580, which can, for example, be coupled to a roof portion of a camper shell. A second telescoping arm 1570 can be coupled to second bracket 1520. Second telescoping arm can comprise various segments (e.g., 1572, 1574, 1576, 1578) and be configured to collapse and expand. One segment (e.g., an innermost segment of telescoping arm 1570) can comprise a second platform 1590, which can, for example, be coupled to another roof portion of a camper shell.

As best seen in FIG. 15B, which illustrates a bottom end portion of lift system 1500, second elongated housing 1550 is illustrated as transparent for purposes of illustrating components housed therein. First elongated housing 1540 extends from adjacent second bracket to first bracket (not shown in FIG. 15B). A motor 1530 is coupled to one or more components housed in the first elongated housing. Second elongated housing 1550 extends from adjacent first bracket to second bracket 1520. A motor 1535 is coupled to one or more components housed in the second elongated housing. For example, a lead screw 1554 (or other translation element) can be coupled to a motor, and a carriage 1551 can comprise a threaded opening comprising threads complementary to threads of the lead screw, such that the carriage 1551 travels along a length of lead screw 1554. The motor can be configured to drive the lead screw to cause the carriage to move in the first direction (e.g., towards or away from bracket 1520). Viewed from another perspective, motor 1535 can be configured to cause the carriage 1551 to move towards and away from second bracket 1520 through the second elongated housing 1550 (e.g., via a lead screw), which can move spring 1556 (having an end positioned in spring channel 1552, or otherwise coupled to carriage 1551) in the same direction as carriage 1551. Such movement can cause the second telescoping arm 1570 to extend from a telescoped arm configuration to an extended arm configuration, and from an extended arm configuration to a telescoped arm configuration. It should be appreciated that motor 1530 can be coupled to one or more components housed in the first elongated housing 1540. For example, a lead screw can be coupled to motor 1530, and a carriage can comprise a threaded opening comprising threads complementary to threads of the lead screw, such that the carriage travels along a length of lead screw housed in first elongated housing 1540. The motor can be configured to drive the lead screw to cause the carriage to move in a direction (e.g., towards or away from bracket 1510). Viewed from another perspective, motor 1530 can be configured to cause the carriage housed in first elongated housing 1540 to move towards and away from first bracket 1510 through the first elongated housing 1540 (e.g., via a lead screw), which can move a spring (having an end positioned in a spring channel of carriage, or otherwise coupled to the carriage) in the same direction as carriage. Such movement can cause the first telescoping arm 1560 to extend from a telescoped arm configuration to an extended arm configuration, and from an extended arm configuration to a telescoped arm configuration.

Each spring (e.g., 1556) can be positioned at least partially in each of an elongated housing (e.g., 1550), a bracket (e.g., 1520), and a telescoping arm (e.g., 1570). Contemplated springs can include a compression spring that gets pushed through the telescoping arm to lift the camper shell (or other collapsible device or system coupled to the lift system) to, for example, at least 2×, at least 3×, at least 4×, or at least 5× of a collapsed height. While the spring can bend around tight corners in the bottom brackets, when the spring (or portion thereof) is positioned in a component (e.g., horizontally straight in an elongated housing or vertically straight in a telescoping arm) such that the spring (or portion thereof) is straight and cannot bend, the spring (or portion thereof) can imitate solid steel and be very strong. As described herein, the spring can be driven by a lead screw assembly that is housed in the elongated housing. The lead screw can be driven by an off the shelf motor and gearbox that is intended for a linear actuator.

Figure 15D:
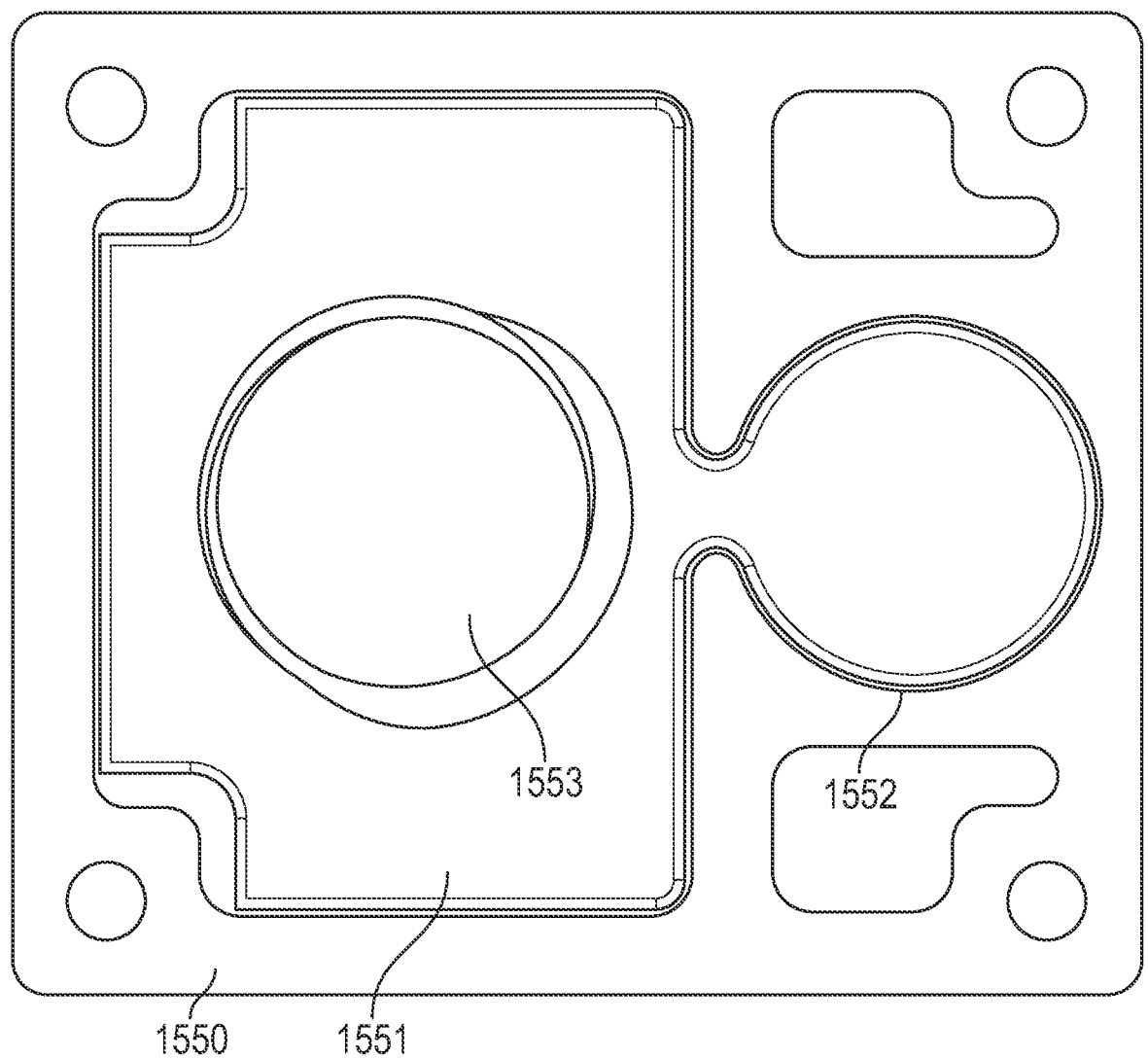

FIG. 15D is a cross-sectional view of carriage 1551 positioned in second elongated housing 1550. Carriage 1551 comprises an opening with threads 1553 complementary to threads of a translation element (e.g., a lead screw, 1554). Carriage also comprises a spring channel or recess 1552 that is sized and dimensioned to secure an end portion of a spring (e.g., spring 1556).

In some aspects, the telescoping arms can have the same or different maximum lengths. For example, the second telescoping arm can be shorter, the same length as, or longer than the first telescoping arm when the first and second telescoping arms are in fully extended arm configurations.

It should be appreciated that each telescoping arm can comprise any suitable number of segments (e.g., between 2-15, between 3-10, between 3-8, between 3-6) and have any suitable collapsed height (e.g., between 0.5-5 feet, between 1-3 feet, between 1-2.5 feet) and expanded height (e.g., between 2-50 feet, between 2-25 feet, between 2-12 feet, between 2-10 feet, between 2-8 feet). In some aspects, a fully expanded height can be at least 2×, at least 3×, at least 4×, or at least 5× greater than a collapsed height.

It should also be appreciated that a lift system can comprise any suitable number of elongated housings, carriages, translation elements (e.g., lead screws, ball screws), springs, motors, brackets, and telescoping arms.

It should also be appreciated that any suitable number of lift systems (e.g., 1, 2, 3, 4, 5) can be used to expand and collapse a camper shell or camper of the disclosure. For example, a lift system can be provided along a left side of a camper shell (with a first platform positioned along a front portion of camper shell and a second platform positioned along a rear portion of camper shell), and a second lift system can be provided along a right side of a camper shell (with a first platform positioned along a front portion of camper shell and a second platform positioned along a rear portion of camper shell).

Figure 16:
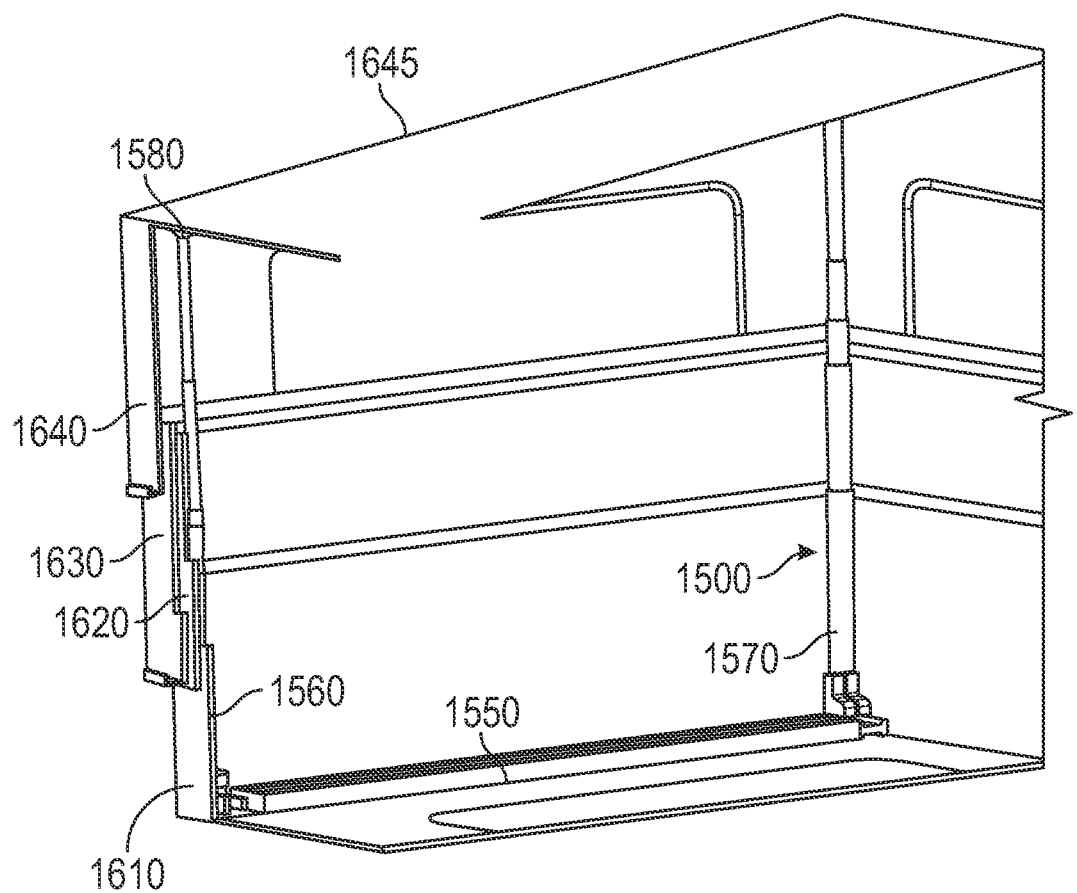
FIG. 16 illustrates a camper having a collapsible camper shell and a lift system, according to an embodiment.

FIG. 16 illustrates a portion of a camper having a collapsible camper shell and a lift system, according to an embodiment. Collapsible camper shell comprises shell portions 1610, 1620, 1630, and 1640. Shell portion 1640 comprises or is coupled to a roof portion 1645. Lift system 1500 is positioned along a left side wall of the camper shell, with a base (including first elongated housing and second elongated housing 1550) positioned on the floor portion of the camper. Telescoping arm 1560 extends from bracket 1510 to an interior surface of roof portion 1645 (e.g., adjacent the back of the camper or shell portions), with platform 1580 in contact (and preferably fastened to) roof portion 1645. Telescoping arm 1570 extends from bracket 1520 to another interior surface of roof portion 1645 (e.g., adjacent the front of the camper or shell portions), with platform 1590 in contact (and preferably fastened to) roof portion 1645. Another lift system can be provided, for example, along the right side wall of the camper shell.

Power Window System

FIGS. 17A-17D illustrate a power window system and components thereof, according to an embodiment. While the description herein is generally directed to power windows having a total thickness of less than 20 mm, or even less than 15 mm, it should be appreciated that any suitable power window systems can be provided on one or more campers, camper shells, and camper shell portions or other dwellings and shells described herein. Power window system 1700 is an exemplary system and is provided to be no thicker (or not more than 1 mm, not more than 5 mm, not more than 10 mm, not more than 20 mm thicker) than camper shell (or camper shell portion) 1750. Such a system can advantageously comprise a combination of miniature lead screws (or other translation elements) and motors along with variable length linkages to open a window in a thin (e.g., 15 mm) wall. The window, frame, mechanicals, and electronic controls can all be provided within a 20 mm, or even a 15 mm thickness so as to not extend outside of the wall (or camper shell) footprint. In some aspects, a suitable power window system can be between 50-1000 mm tall, between 100-800 mm tall, between 200-600 mm tall, or any other suitable height. In some aspects, a suitable power window system can be between 50-2500 mm tall, between 100-1000 mm tall, between 400-1400 mm tall, or any other suitable width. In some aspects, a suitable window pane can be between 50-1000 mm tall, between 100-800 mm tall, between 200-600 mm tall, or any other suitable height. In some aspects, a suitable window pane can be between 50-2500 mm tall, between 100-1000 mm tall, between 400-1400 mm tall, or any other suitable width. In some aspects, a suitable window pane (e.g., window pane comprising a multi-layer stack as described herein) can be between 1-30 mm thick, between 1-25 mm thick, between 5-25 mm thick, or any other suitable thickness.

System 100 comprises a window pane 1710, which can be a multi-layer stack comprising an air gap 1730, a willow glass 1735, and several other layers. For example, window pane 1710 can comprise, from outside to in, one, some or all of (a) a willow glass (for scratch resistance), a clear LEXAN 9034 (or other polycarbonate sheet) for structure, a Polymer Dispersed Liquid Crystal (PDLC) or other glass or film for dynamic privacy and shade, an air gap for insulation, a clear LEXAN 9034 (or other polycarbonate sheet) for structure, and a willow glass for scratch resistance. A foam or other weather seal 1740 can be provided along an edge portion of the window frame. An insect screen 1725 comprising a set of disk magnets 1720 that will be attracted to the window frame 1762 (e.g., frame made of ferrous steel) can be provided. The magnetic attachment can allow users to easily remove the insect screen for better visibility or to replace a damaged screen.

Figure 17A:
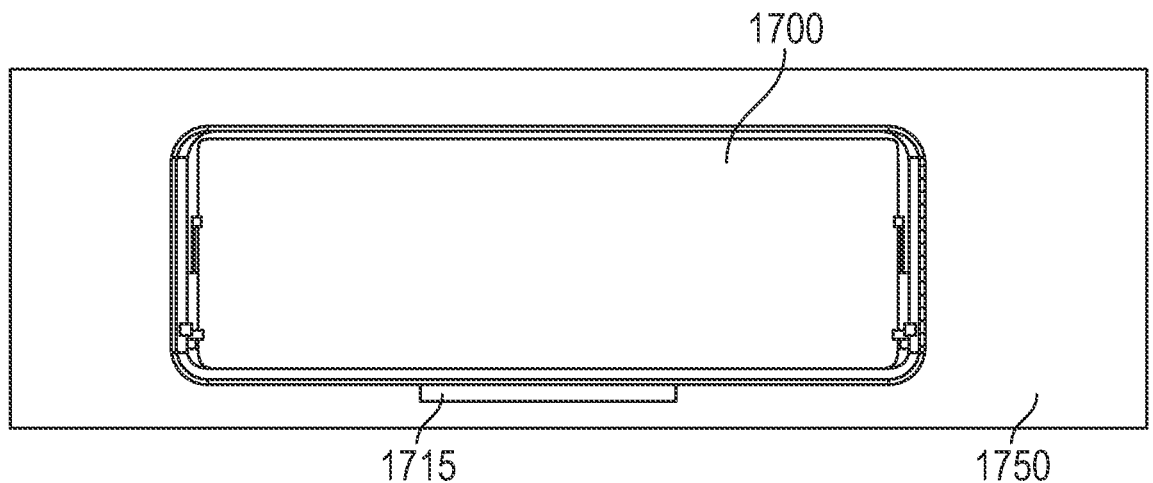
FIGS. 17A-17D illustrate a power window system and components thereof, according to an embodiment.
Figure 17B:
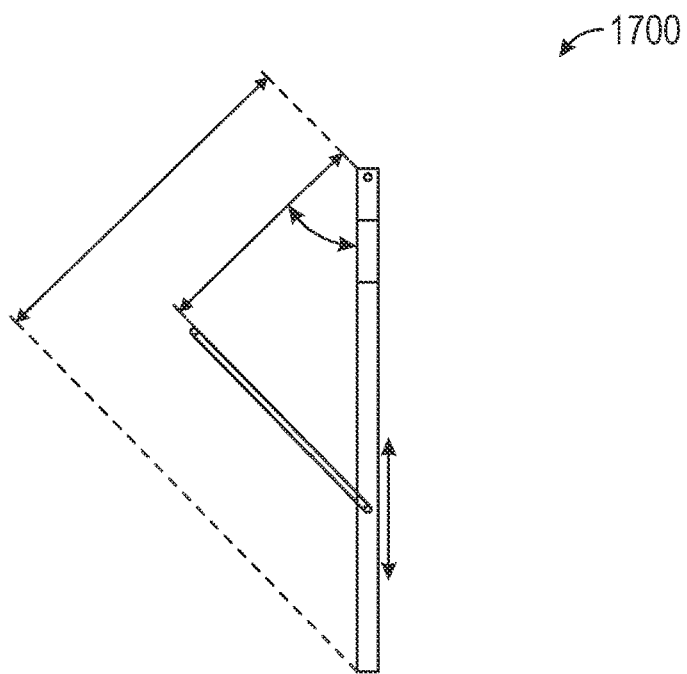
Figure 17C:
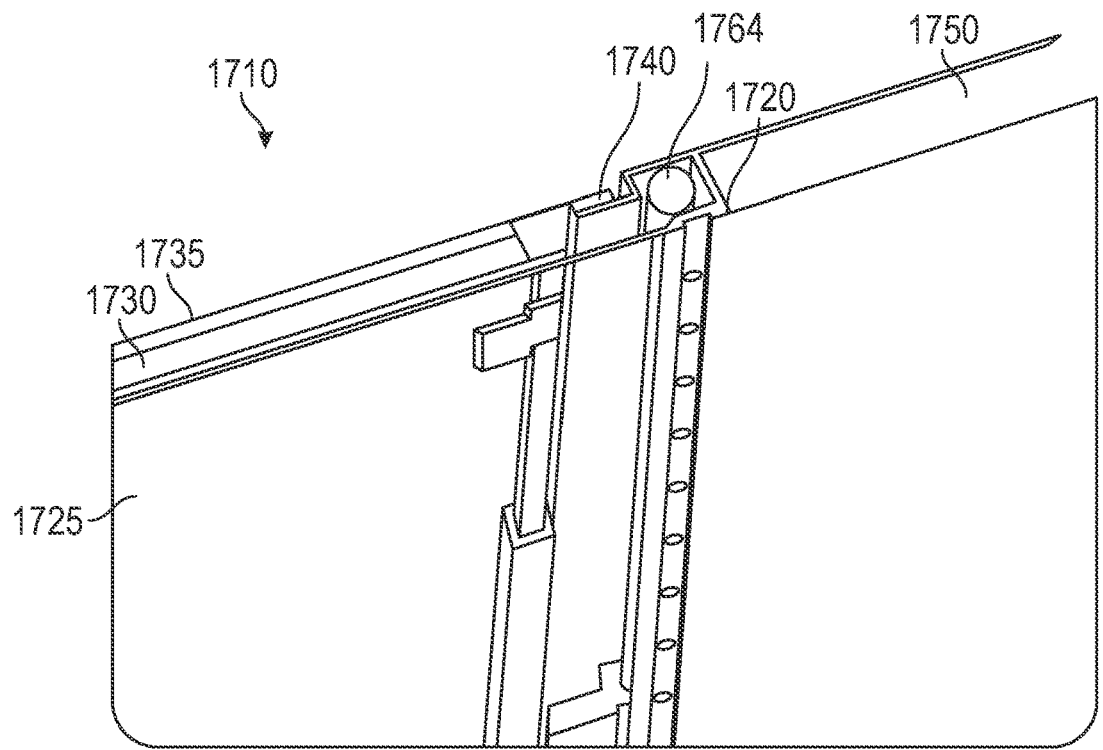
Figure 17D:
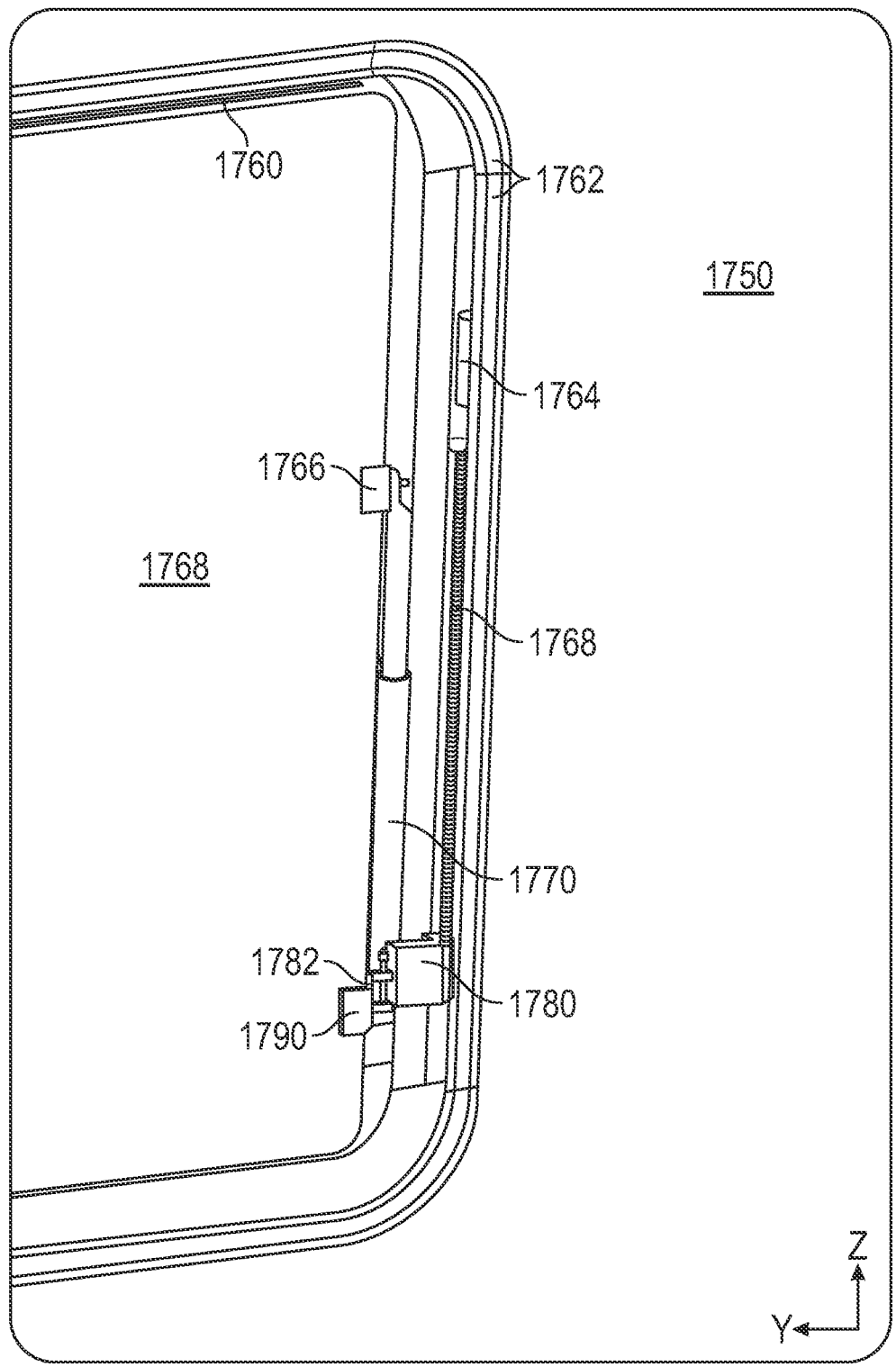

A control unit 1715 can be coupled to one or more adjustment mechanisms, which is best illustrated in FIG. 17D. A control unit 1715 can be provided for each window, and can be configured to control the opening and closing, tilting or the window, and can optionally incorporate a camera (e.g., for surveillance), and provide a USB port to power/charge devices. Although a specific adjustment mechanism is described herein, it should be appreciated that any suitable adjustment mechanism(s) can be provided in contemplated power window systems. The adjustment mechanism(s) of FIG. 17D are coupled to window pane 1710 via a first attachment 1766 coupled to (e.g, affixed to) the window pane. The adjustment mechanism can also be coupled to a window frame 1762 or can compose the window frame (e.g., compose a side wall of a window frame). In the embodiment illustrated, first attachment 1766 comprises a pivot joint, and is coupled to an end portion of a variable length window link 1770. The window adjustment mechanism can comprise a motor (e.g., a micromotor with gearbox) 1764, a lead screw 1768 (or other translation element) coupled to the motor 1764, variable length window link 1770, and a lead screw nut 1780, wherein a first end of the link 1770 is pivotably coupled to the first attachment 1766 and a second end of the link 1770 is coupled to lead screw nut 1780, and wherein when the lead screw nut 1780 moves in an upward direction, the link 1770 shortens or collapses and applies a force to the first attachment 1766 component and causes the window to rotate about a top axis or about window hinge 1760. In some aspects, the motor/gearbox 1764 is configured to turn the lead screw 1768 or other translation element, which moves the lead screw nut 1780 or other translation element nut/carriage. The variable length link 1770 can have a compression length and a tension length different from the compression length. In compression (lead screw nut moved up or moving up), the link applies force to first attachment 1766 to force the window pane to rotate about top axis and open. When the window is in an open position and the lead screw begins traveling downwards, this can allow window to close due to gravity and there can still be some compression on the link due to the weight of the window pane. Once the window reaches a closed position, the weight of the window can be fully on the top window hinge 1760 and the lower half of variable length window link can continue down with lead screw nut 1780 to engage window lock pin 1790 for security. In some alternative embodiments, the link can comprise a fixed length link. In some embodiments, lead screw nut 1780 can comprise a ramp 1782 that engages lock pin 1790 attached to window pane 1710 and pulls the window pane in to close.

While specific power window systems are described herein, it should be appreciated that window systems having any suitable adjustment mechanisms are contemplated herein, including, for example, adjustment mechanisms comprising push/pull cables, linear actuator(s), spring system(s), or flexible cable (plumbers snake). It should also be appreciated that while specific window stacks are described herein, contemplated window panes and window stacks can comprise any suitable number and type of components or sheets, which may optionally be modified for weight, cost, and functional tradeoffs.

Accessory Mounting Device

In some aspects, an accessory mounting device is provided, which can advantageously be used to couple various accessories and devices (e.g., chairs, beds, shelves, cupholders, televisions, appliances, frames) to, for example, a slot of an edge trim positioned inside or outside a camper or other dwelling. In some aspects, an accessory mounting device can comprise a J-hook or other hook component having a curved end sized and dimensioned to be supported by a protruding piece of an open end of a T-slot or other slot. In some aspects, the hook component can comprise a first curved end sized and dimensioned to couple with a T-slot or other slot of an upper edge trim, and a second curved end sized and dimensioned to couple with a T-slot of other slot of a lower edge trim. The hook component can be coupled to a bracket, for example, a TV-bracket or other bracket configured to couple to an accessory or device. A plunger component can couple with the hook component (e.g., by extending through an opening of the hook component), and can be configured to apply a force on the bracket and keep the hook component engaged with the T-slot or other slot. To mount the accessory mounting device, a user can compress the plunger component against a shell portion (or extending portion) and slide the bracket upwards or downwards until a curved end of the hook component engages with the T-slot or other slot. To dismount the accessory mounting device, a user can compress the plunger component against the shell portion (or extending portion) and slide the bracket up or down until the curved end of the hook component disengages from the T-slot or other component.

FIGS. 13A-13C illustrate an accessory mounting device, according to an embodiment. The accessory mounting device comprises a hooked component 1385 comprising an upper curved end and a lower curved end. Hooked component 1385 is coupled to a plunger component 1380, which can be, for example, a 10-25 lb plunger. In some aspects, the plunger component extends through an opening of the hooked component. Hooked component 1385 can be coupled to (e.g., attached to) a bracket 1351. For example, a bracket can have a curved end that engages an upper or lower curved end of the hooked component. The bracket can be coupled to a device or accessory, such as television 1360. In the embodiment shown in FIGS. 13A-13C, bracket 1351 is coupled to a television mounting device 1350 comprising handles, and an articulating mount 1352. Television mounting device 1350 can further be configured to hold a speaker 1370.

As best seen in FIG. 13A, one or more hooked components and plunger components can be provided to mount an accessory or device to an edge trim. In FIG. 13A, the television 1360 is mounted outside of a camper or dwelling. As best seen in FIG. 13B, the accessory mounting device can be used to mount an accessory (e.g., television 1360) to an outside portion of a shell portion or dwelling. Panel portion 1325 is adjacent panel portion 1310 and comprises a lower edge trim 1320. Panel 1310 comprises a lower edge trim 1330. To mount the television to be positioned outside of the dwelling via accessory mounting device, a user can compress the plunger component 1380 against a shell portion (or extending portion) adjacent the shell portion comprising the edge trim and slide the bracket up or down (here up) until a curved end of the hook component (e.g., upper curve end) engages with the T-slot or other slot of edge trim 1320. To dismount the accessory mounting device, a user can compress the plunger component against the shell portion (or extending portion) adjacent the shell portion comprising the edge trim and slide the bracket up or down (here down) until the curved end of the hook component disengages from the T-slot or other component.

As best seen in FIG. 13C, the accessory mounting device can be used to mount an accessory (e.g., television 1360) to an interior portion of a shell portion or dwelling. Panel portion 1315 can comprise an upper edge trim 1335. To mount the television to be positioned inside of the dwelling via accessory mounting device, a user can compress the plunger component 1380 against a shell portion (or extending portion) adjacent the shell portion comprising the edge trim and slide the bracket up or down (here down) until a curved end of the hook component (e.g., lower curved end) engages with the T-slot or other slot of edge trim 1335. To dismount the accessory mounting device, a user can compress the plunger component against the shell portion (or extending portion) adjacent the shell portion comprising the edge trim and slide the bracket up or down (here up) until the curved end of the hook component disengages from the T-slot or other component.

While exemplary accessory mounting devices are described herein, it should be appreciated that all suitable accessory mounting devices are contemplated herein, including those that are configured to be stably coupled with a T-slot or other slot of an edge trim.

Adjustable Bed

In some aspects, an adjustable bed is provided, comprising a frame having a first portion, a second portion, and a third portion, wherein the first portion is coupled to the second portion via a rotatable member, and the second portion is coupled to the third portion via a rotatable member. In some aspects, the frame can comprise one or more leg portions rotatably coupled to one or more of the first, second and third portions. One or more of the leg portions can be rotatably coupled to at least one of the first, second and third portions at or near (or in line with, for example, when viewed from a right or left side of the adjustable bed) one or more of the rotatable members to provide stability and strength. In some aspects, the frame can comprise a fourth portion, and the third portion can be coupled to the fourth portion via a rotatable member. In some aspects, the first portion can optionally configured to couple to a vertically slidable component of a camper wall. In some aspects, the adjustable bed does not include any legs extending from the frame portion that is configured to be used as a seat bottom when used as a chair. In some aspects, a set of legs extend only from a front edge (or area within 5 inches, within 3 inches, or within 2 inches of the front edge) of the frame portion that is configured to be used as a seat bottom when used as a chair (e.g., does not include a set of legs extending from a rear edge of the frame portion that is configured to be used as a seat bottom when used as a chair).

In some aspects, an adjustable bed is provided, comprising a frame having a first portion, a second portion, and a third portion, wherein the first portion is coupled to the second portion via a rotatable member, and the second portion is coupled to the third portion via a rotatable member, and a first set of legs rotatably coupled to the first portion and configured to adjust from a stow configuration to a use configuration.

In some aspects, an adjustable bed is provided, comprising a frame having a first portion, a second portion, and a third portion, wherein the first portion is coupled to the second portion via a rotatable member, and the second portion is coupled to the third portion via a rotatable member, and wherein the first portion is configured to couple to a slot of an edge trim of a shell portion of a camper.

FIGS. 7A-7E illustrate exemplary adjustable beds 700 and 750, according to some embodiments. The adjustable beds described herein can optionally be used as chairs or recliners in addition to beds.

Figure 7A:
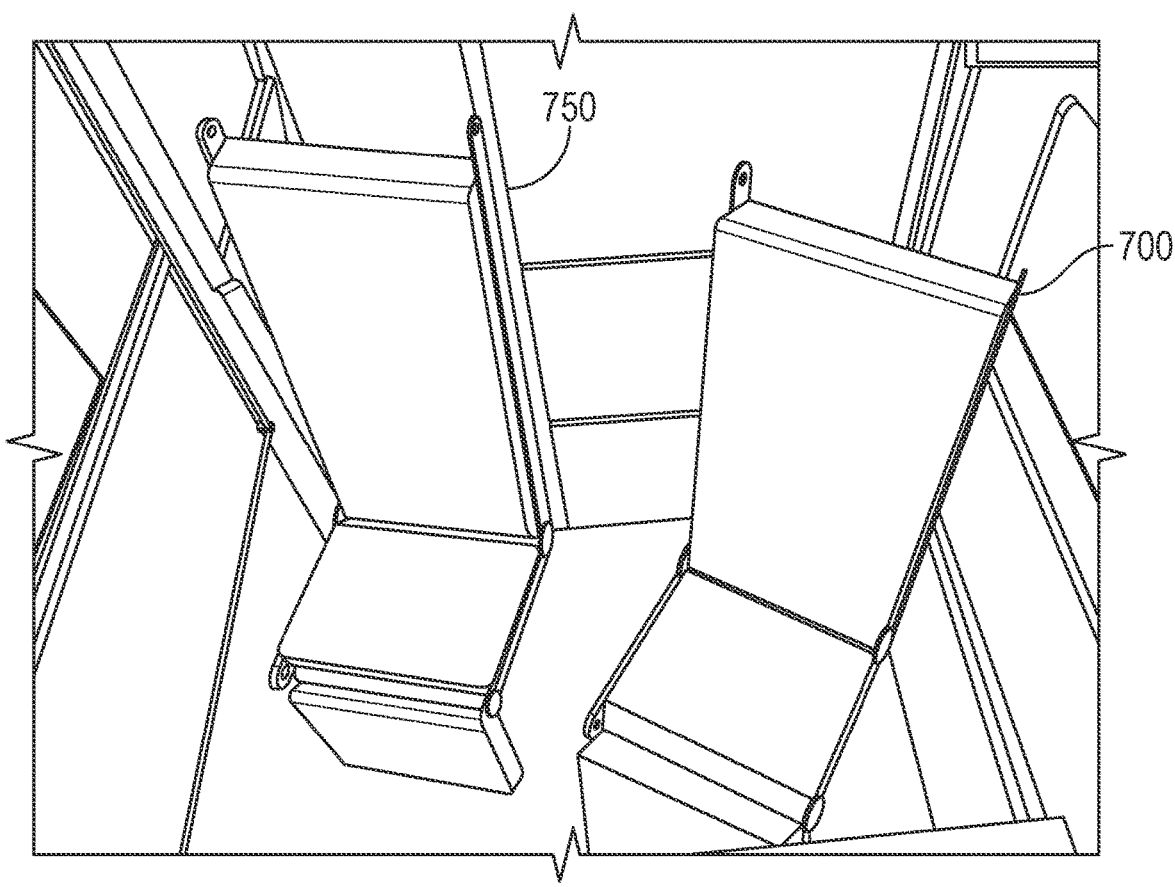
FIGS. 7A-7E illustrate exemplary adjustable chairs, recliners and beds, according to an embodiment.

In FIG. 7A, adjustable beds 700 and 750 are shown as free-standing chairs. Adjustable bed 700 comprises a first rotation mechanism 715 (e.g., a pivot, a hinge). Adjustable bed 750 comprises a frame that includes a second rotation mechanism 765 coupled to a first frame portion (e.g., seat back) and a leg, a third rotation mechanism 770 between first frame portion 755 (e.g., seat back) and a second frame portion 756 (e.g., seat bottom), and a fourth rotation mechanism 775 between second frame portion 756 and a third frame portion 757 (e.g., portion configured to fold under second frame portion 756 when used as a chair, and to fold out when used as a bed).

Figure 7B:
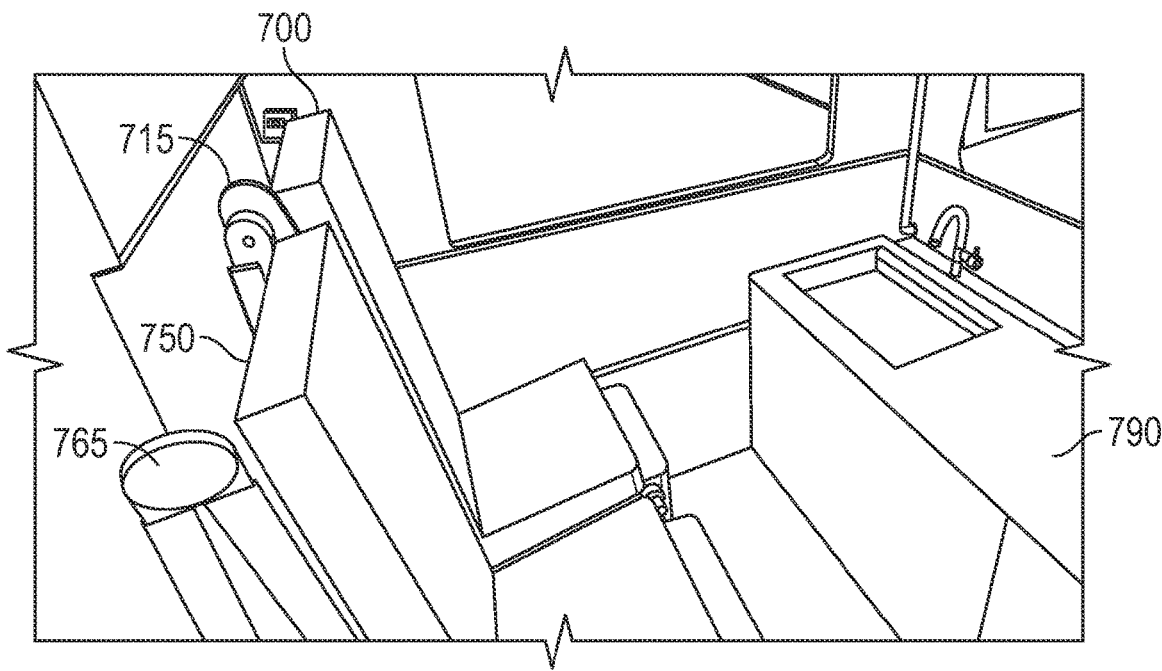
Figure 7C:
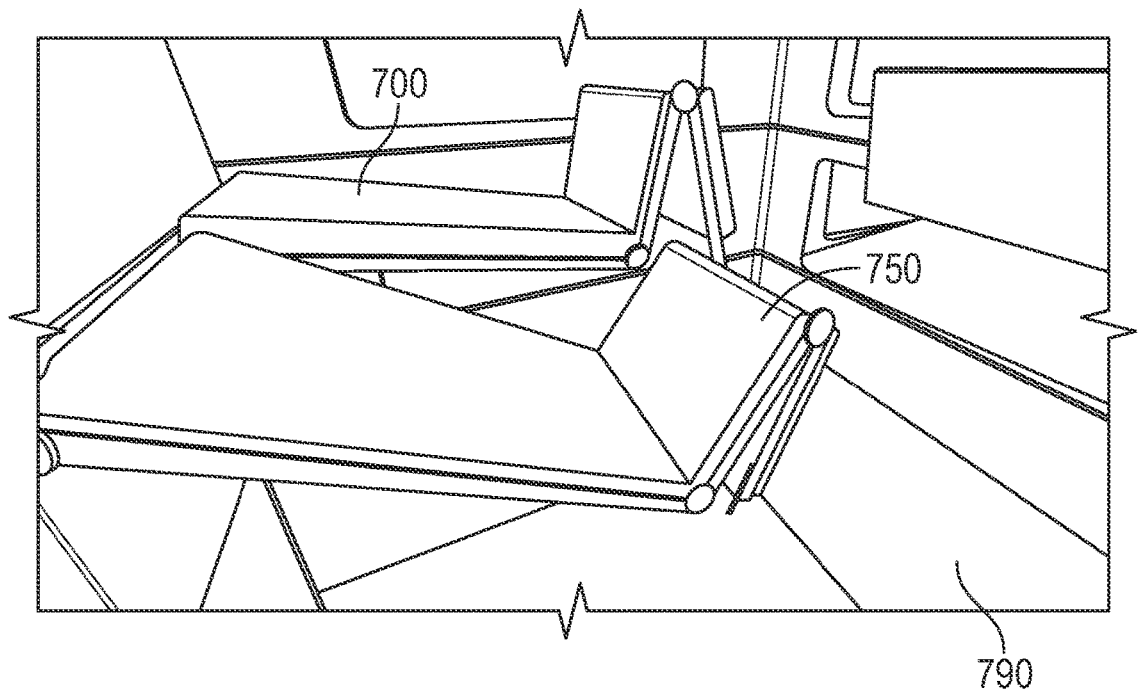
Figure 7D:
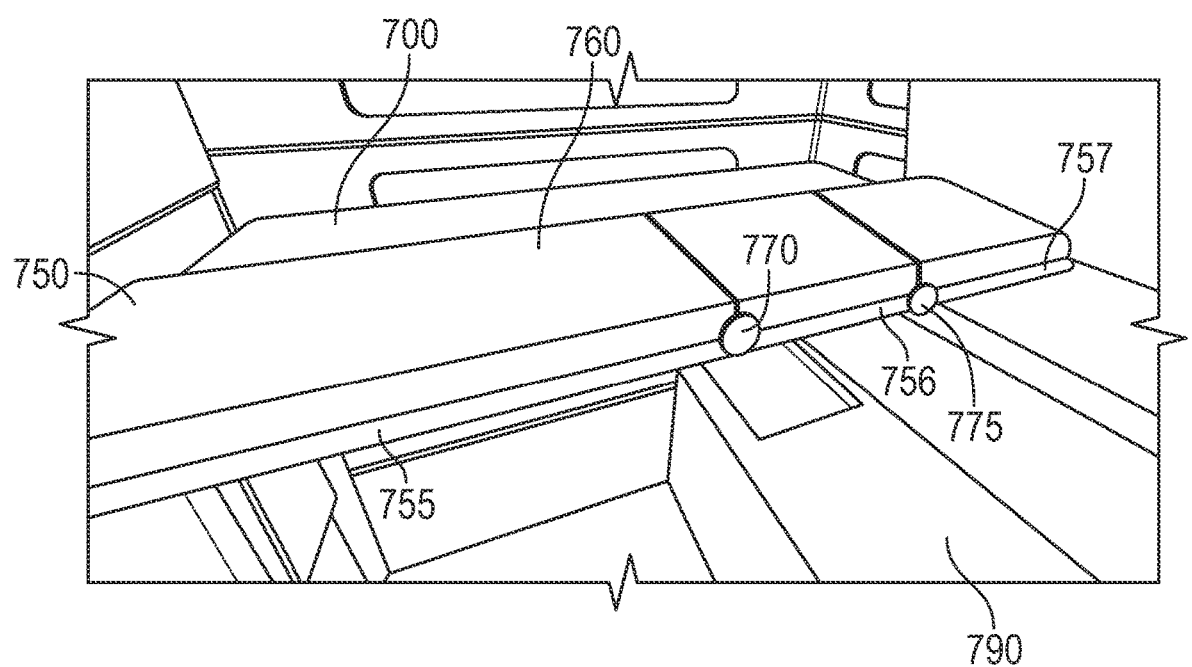
Figure 7E:
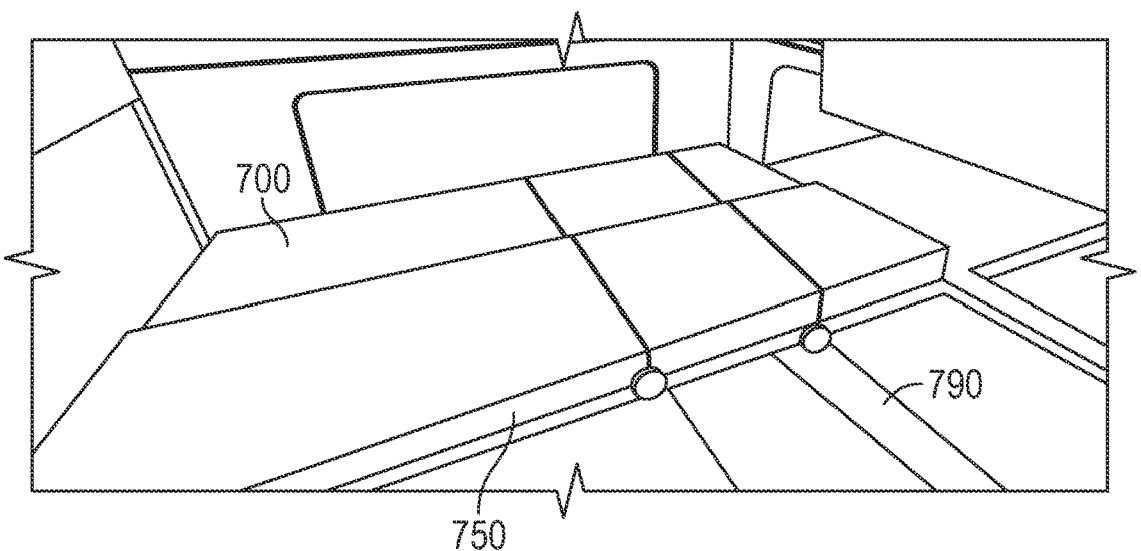

Adjustable bed 750 also comprises a cushion 760, such as a high-density foam cushion or topper, which can optionally be segmented. In FIG. 7B, adjustable beds 700 and 750 are shown placed against a partition or interior wall portion of a camper, trailer or other dwelling. In FIG. 7C, the beds are raised (e.g., via an extension of a leg coupled to the second rotation mechanism 765, or in some embodiments where the adjustable bed is secured to a wall component, via a sliding of a wall component). The first frame portion 755 is rotated relative to the leg via second rotation mechanism 765, and third frame portion 757 can be folded in towards and beneath second frame portion 756 or extended out (as shown in FIG. 7D) via fourth rotation mechanism 775. In FIG. 7D, frame portions 755, 756 and 757 form a straight line (or a substantially straight line) and adjustable beds 700 and 750 are positioned above and spaced apart from console, sink, or other component 790. In FIG. 7E, adjustable beds 700 and 750 are lowered (e.g., via a collapsing of a leg coupled to second rotation mechanism 765, or in some embodiments where the adjustable bed is secured to a wall component, via a sliding/lowering of a wall component). A first end of the adjustable beds (e.g., an end that is configured to support a head of a user in a seated and supine position, for example, first portion 755) can be supported by a leg, and an opposite end of the adjustable bed can be supported by console 790 or other device separate from adjustable bed when the bed is used as a chair. In some embodiments, an adjustable bed can only comprise one set of legs (e.g., 1 or 2 legs) coupled to first portion 755. In some embodiments, a second set of legs can be provided (e.g., coupled to second frame portion 756 or third frame portion 757). Each of the legs can be configured to rotate under the frame structure, or extend out to support the frame structure. For example, each of the legs can be configured to rotate from about 0 to about 180 degrees from a frame or frame portion, from about 0 to about 90 degrees from a frame or frame portion, or from about 0 to 135 degrees from a frame or frame portion (e.g., for use as a recliner or lounge chair).

While adjustable beds 700 and 750 are shown inside a camper, it should be appreciated that adjustable beds described herein can be used outside of the camper (e.g., as free standing chairs or beds/

Figure 8A:
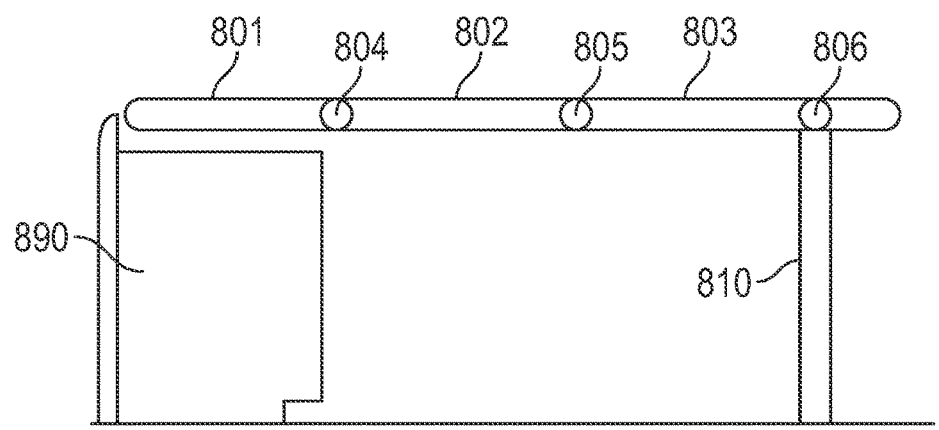
FIGS. 8A-8B illustrate an adjustable bed, according to an embodiment.
Figure 8B:
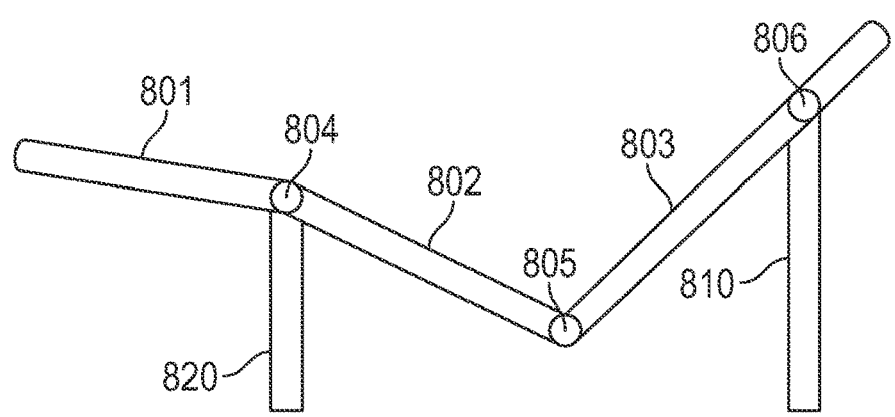

FIGS. 8A-8B illustrate an adjustable bed, according to an embodiment. Adjustable bed 800 comprises a first bed portion 801, a second bed portion 802, and a third bed portion 803. Each bed portion can comprise one or more of a frame component (e.g., metal), and a cushion component (e.g., foam padding). A first rotation mechanism 804 is provided between first bed portion 801 and second bed portion 802. In some aspects, first rotation mechanism rotatably couples first bed portion 801 to second bed portion 802. A second rotation mechanism 805 is provided between second bed portion 802 and third bed portion 803. In some aspects, second rotation mechanism 805 rotatably couples second bed portion 802 to third bed portion 803. A third rotation mechanism 805 can be provided, which couples third bed portion 803 to a leg or set of legs 810. Leg 810 can rotate relative to third bed portion 803, for example, between 0-180 degrees, or between 0-90 degrees. In some embodiments, a second leg 820 can be rotatably coupled to one or more other bed portions, and be configured to be used to support a portion of the bed (e.g., as shown in FIG. 8B), or can be stowed under one or more bed portions (e.g., in FIG. 8A) where bed 800 is supported on one end by a console 890 in an interior of a camper (or other device interior or exterior to the camper, e.g., a cooler, a dresser, a refrigerator, a sink).

It should be appreciated that an adjustable bed of the disclosure can comprise any suitable number of frame portions (e.g., 2, 3, 4) and sets of legs (e.g., 1, 2, 3). In some embodiments, one, some or all of the frame portions can comprise two or more telescope portions (e.g., a rectangular telescoping frame portion). In some embodiments, one, some or all of the frame portions can comprise two or more parallel rows of two or more telescope portions (e.g., 2, 3, 4, 5, 6, 7, 8 rows). Such telescoping portions can allow each frame portion to be independently adjusted so the chair can be adapted to fit people of different shapes (e.g., long/short torso, long/short upper legs).

In some embodiments, one, some or all of the legs that connect to the frame of an adjustable bed can comprise telescoping legs, for example, so the seat height and the bed height can be adjusted.

In some embodiments, an adjustable bed can comprise a frame having a first frame portion that acts as a seat back when the adjustable bed is used as a chair, and a second frame portion that acts as a seat bottom when the adjustable bed is used as a chair. The first frame portion and the second frame portion can be rotatably coupled to one another via a rotation mechanism (e.g., pivot, hinge). Each of the first frame portion and the second frame portion can comprise telescoping legs and be collapsible and expandable. A set of telescoping legs (e.g., 1 or 2 legs) can be rotatably coupled to the top, first end portion or other portion of the first frame portion and a set of legs can be rotatably coupled to a bottom, fourth end portion or other portion of the second frame portion. In some aspects, the first frame portion comprises a first end portion and a second end portion, the second frame portion comprises a third end portion and a fourth end portion, and the second end portion is adjacent the third end portion with the first end portion and fourth end portion being opposite ends of the adjustable bed (e.g., when in a bed configuration). When in a seated/chair configuration, the first set of legs can be parallel or substantially parallel to the first frame portion, and longer in length than the first frame portion. When in a seated/chair configuration, the second set of legs can be extended and perpendicular or substantially perpendicular to the second frame portion. When in a sleep/bed configuration, the front legs rotatably coupled to the second frame portion can be folded under to become parallel or substantially parallel with the second frame portion, and the second frame portion can be extended out (rotated relative to the first frame portion, for example, to form a flat or substantially flat surface). The first frame portion can also be extended (e.g., such that first frame portion and the first set of legs are perpendicular or substantially perpendicular to each other) until the first frame portion and the second frame portion provide the full bed length of, for example, between 60-100 inches, between 70-90 inches, or about 80 inches. In some aspects, the first frame portion can have a length that is at least 110%, at least 120%, at least 130%, at least 140%, or at least 150% of a length of the second frame portion. In some aspects, wherein the first frame portion and the second frame portion are collapsible, the first frame portion can have a length in a collapsed configuration that is at least 110%, at least 120%, at least 130%, at least 140%, or at least 150% of a length of the second frame portion in a collapsed configuration. In some aspects, wherein the first frame portion and the second frame portion are collapsible, the first frame portion can have a length in an expanded configuration that is at least 110%, at least 120%, at least 130%, at least 140%, or at least 150% of a length of the second frame portion in an expanded configuration. In some aspects, wherein the first frame portion is collapsible, the first frame portion can have a length in an expanded configuration that is at least 110%, at least 120%, at least 130%, at least 140%, or at least 150% of a length of the first frame portion in a collapsed configuration. In some aspects, wherein the second frame portion is collapsible, the second frame portion can have a length in an expanded configuration that is at least 110%, at least 120%, at least 130%, at least 140%, or at least 150% of a length of the second frame portion in a collapsed configuration. The second frame portion and a portion of the first frame portion can be configured to rest on top of the kitchen counter/cabinet/table, which can provide support for one end of the adjustable bed. In some aspects, the height of the kitchen counter, console or other component can also be power adjustable and have collapsing and expanding components. The other end of the seat back can be supported by the outer most telescopic tubes that form the rear legs of the chair.

In some embodiments, it is contemplated that when the first and second frame portions are in collapsed configurations, the telescopic tubes of the first frame portion can be positioned within the gaps between the telescopic tubes of the second frame portion to enable the whole chair/bed to fold into a very thin space. In some embodiments, the foam cushion(s) can be removable from the frame and connect to it via magnets, straps, hook and loop fasteners, or any other suitable fastening mechanisms. The first and second frame portions may be designed, in some embodiments, to allow some of the telescoping frames or legs to be adjusted independently of the others in order to form a zero gravity position while in bed/sleep mode. It may further be possible to adjust the chair to recline and/or form a zero gravity chair.

Thus, specific examples of collapsible campers, trailers and other dwellings, collapsible shells, and adjustable components and accessories for campers and other dwellings have been disclosed. The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

As used herein and in the appended claims, the singular forms "a," "an," and "the" include plural referents unless the context clearly dictates otherwise. It is further noted that the claims can be drafted to exclude any optional element. As such, this statement is intended to serve as antecedent basis for use of such exclusive terminology as "solely," "only" and the like in connection with the recitation of claim elements, or use of a "negative" limitation.

Reference throughout this specification to "an embodiment" or "an implementation" means that a particular feature, structure, or characteristic described in connection with the embodiment is included in at least one embodiment or implementation. Thus, appearances of the phrases "in an embodiment" in various places throughout this specification are not necessarily all referring to the same embodiment or a single exclusive embodiment. Furthermore, the particular features, structures, or characteristics described herein may be combined in any suitable manner in one or more embodiments or one or more implementations.

The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Certain numerical values and ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating un-recited number may be a number which, in the context in which it is presented, provides the substantial equivalent of the specifically recited number.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

All structural and functional equivalents to the components of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A collapsible dwelling, comprising:
   a collapsible shell comprising an inner shell portion, and an outer shell portion, wherein the inner shell portion, and the outer shell portion are adjustably coupled to one another such that the collapsible shell is adjustable from a collapsed configuration to an extended configuration;
   a lift system coupled to the collapsible shell and configured to adjust the collapsible shell from the collapsed configuration to the extended configuration;
   a mid-shell portion, an upper edge trim coupled to an upper edge of the mid-shell portion, and a lower edge trim coupled to a lower edge of the outer shell portion, wherein the upper edge trim comprises a lower leg, wherein the lower edge trim comprises an upper leg, and wherein the upper leg of the lower edge trim engages a lower leg of the upper edge trim and pulls up the mid-shell portion when the collapsible shell is adjusted from the collapsed configuration to the extended configuration; and
   wherein at least one of the upper edge trim and the lower edge trim comprises a T-slot configured to receive a portion of an accessory mount.

2. The collapsible dwelling of claim 1, further comprising the mid-shell portion positioned between the inner shell portion and the outer shell portion, wherein the mid-shell portion is directly or indirectly coupled to the inner shell portion and the outer shell portion.

3. The collapsible dwelling of claim 1, wherein the lift system comprises:
   a first telescoping arm; and
   a first motor configured to cause the first telescoping arm to extend from a telescoped arm configuration to an extended arm configuration.

4. The collapsible dwelling of claim 3, wherein the outer shell portion comprises or is coupled to a roof portion, wherein the lift system further comprises a base housing the first motor, wherein a first end of the first telescoping arm couples to the base, and wherein a second end of the first telescoping arm couples to a bottom side of the roof portion.

5. The collapsible dwelling of claim 4, further comprising a compressed spring, wherein the base further comprises a first elongated housing coupled to a first bracket, and wherein the compressed spring is movably positioned at least partially within the first elongated housing, the first bracket, and the first telescoping arm.

6. The collapsible dwelling of claim 5, further comprising a translation element coupled to the first motor and a carriage positioned in the first elongated housing, wherein the carriage is coupled to the compressed spring, and wherein the first motor is configured to cause the carriage to move in a first direction along the first elongated housing, which moves the compressed spring in the first direction and causes the first telescoping arm to extend from a telescoped arm configuration to an extended arm configuration.

7. The collapsible dwelling of claim 3, wherein the lift system further comprises a second telescoping arm, and wherein the first telescoping arm has a length that is shorter than a length of the second telescoping arm when the first telescoping arm is in the extended arm configuration and the second telescoping arm is in an extended arm configuration.

8. The collapsible dwelling of claim 1, wherein the inner shell portion has a smaller height than the mid-shell portion, and wherein the mid-shell portion has a smaller height than the outer shell portion.

9. The collapsible dwelling of claim 8, wherein the inner shell portion has a smaller horizontal length than the mid-shell portion, and wherein the mid-shell portion has a smaller horizontal length than the outer shell portion.

10. The collapsible dwelling of claim 1, wherein the outer shell portion comprises or is coupled to a roof portion, and wherein the roof portion is angled relative to horizontal.

11. The collapsible dwelling of claim 1, wherein the collapsible shell further comprises a first expanding portion coupled to at least one of the inner shell portion, the mid-shell portion, and the outer shell portion, wherein an inner surface of the at least one of the inner shell portion, the mid-shell portion, and the outer shell portion comprises a first adjustment component, wherein an outer surface of the first expanding portion comprises a second adjustment component, wherein the first adjustment component and the second adjustment component are slidably coupled to one another such that the first expanding portion is adjustable horizontally relative to at least one of the inner shell portion, the mid-shell portion, and the outer shell portion.

12. The collapsible dwelling of claim 1, wherein the lift system comprises:
 a base extending between a first bracket and a second bracket, the base comprising:
  a first elongated housing coupled to the first bracket and a second elongated housing coupled to the second bracket;
  a carriage positioned in the first elongated housing, the carriage coupled to a spring;
  a motor coupled to the carriage;
  a first telescoping arm coupled to the first bracket;
  a second telescoping arm coupled to the second bracket; and
  a translation element;
 wherein the spring is positioned at least partially in each of the first elongated housing, the first bracket, and the first telescoping arm;
 wherein the motor is configured to cause the carriage to move in a first direction through the first elongated housing, which moves the spring in the first direction and causes the first telescoping arm to extend from a telescoped arm configuration to an extended arm configuration,
 wherein the carriage comprises a threaded opening and a spring channel;
 wherein the threaded opening comprises threads complementary to threads of the translation element, and wherein the motor is configured to drive the translation element to cause the carriage to move in the first direction; and
 wherein the spring channel is dimensioned to secure an end portion of the spring.

13. The collapsible dwelling of claim 12, wherein the base further comprises:
 a second elongated housing coupled to the first bracket and the second bracket;
 a second carriage positioned in the second elongated housing, the second carriage coupled to a second spring; and
 a second motor coupled to the second carriage;
 wherein the second spring is positioned at least partially in each of the second elongated housing, the second bracket, and the second telescoping arm; and
 wherein the second motor is configured to cause the second carriage to move in a second direction through the second elongated housing, which moves the second spring in the second direction and causes the second telescoping arm to extend from a telescoped arm configuration to an extended arm configuration.

14. The collapsible dwelling of claim 12, wherein the second telescoping arm is longer than the first telescoping arm when the first and the second telescoping arms are in fully extended arm configurations.

* * * * *